United States Patent [19]
Ushiro et al.

[11] Patent Number: 5,991,466
[45] Date of Patent: Nov. 23, 1999

[54] IMAGE RETRIEVING APPARATUS

[75] Inventors: Takahiro Ushiro; Yoshinobu Aiba; Hideto Kohtani, all of Yokohama, Japan

[73] Assignee: Canon Kabushiki Kaisha, Tokyo, Japan

[21] Appl. No.: 08/358,998

[22] Filed: Dec. 19, 1994

Related U.S. Application Data

[63] Continuation of application No. 07/921,118, Jul. 29, 1992, abandoned.

[30] Foreign Application Priority Data

Jul. 31, 1991 [JP] Japan .................................. 3-214739
Jul. 31, 1991 [JP] Japan .................................. 3-214743

[51] Int. Cl.⁶ .............................................. G06K 9/54
[52] U.S. Cl. .................................... 382/305; 382/298
[58] Field of Search .................................... 382/305, 306, 382/282, 312, 298, 209, 217, 218, 219; 358/403, 453

[56] References Cited

U.S. PATENT DOCUMENTS

| | | | |
|---|---|---|---|
| 4,760,606 | 7/1988 | Lesnick et al. ........................... | 382/61 |
| 4,797,946 | 1/1989 | Katsuta et al. ........................... | 382/61 |
| 5,010,581 | 4/1991 | Kanno ..................................... | 382/56 |
| 5,027,421 | 6/1991 | Kanno ..................................... | 382/61 |
| 5,048,094 | 9/1991 | Aoyama et al. ......................... | 382/8 |
| 5,093,873 | 3/1992 | Takahashi ............................... | 382/61 |
| 5,172,245 | 12/1992 | Kita et al. ............................... | 382/61 |
| 5,185,821 | 2/1993 | Yoda ....................................... | 382/61 |

*Primary Examiner*—Yon J. Couso
*Attorney, Agent, or Firm*—Fitzpatrick, Cella, Harper & Scinto

[57] ABSTRACT

An image retrieving apparatus having a reading unit for reading the image of an original, a comparing unit for comparing the image data of the original outputted from the reading unit with a plurality of image data stored in a storage medium, and a retrieving unit for outputting one of the image data generally coincident with the image data of the original from the storage medium, and the discrimination information for discriminating the image data generally coincident, in accordance with the comparison result by the comparing unit.

30 Claims, 24 Drawing Sheets

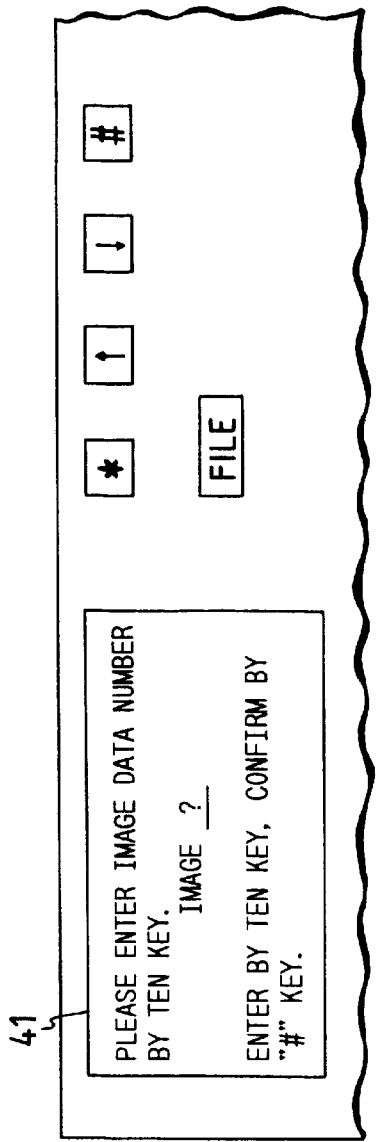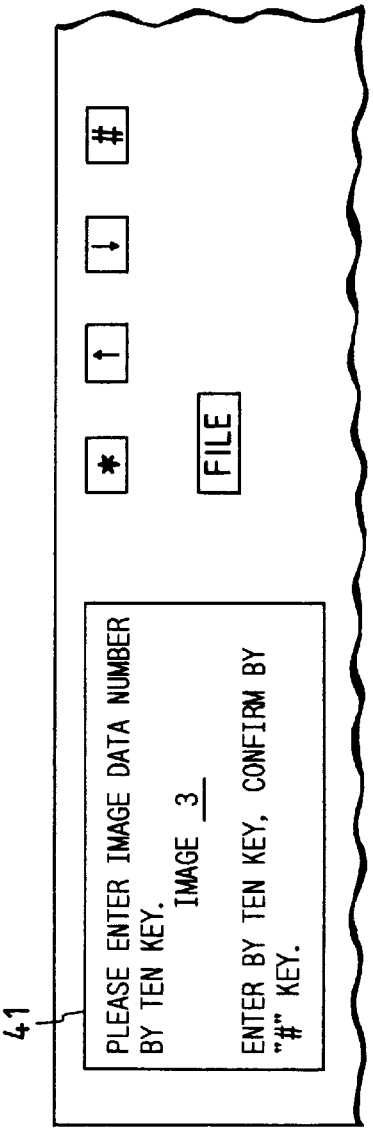

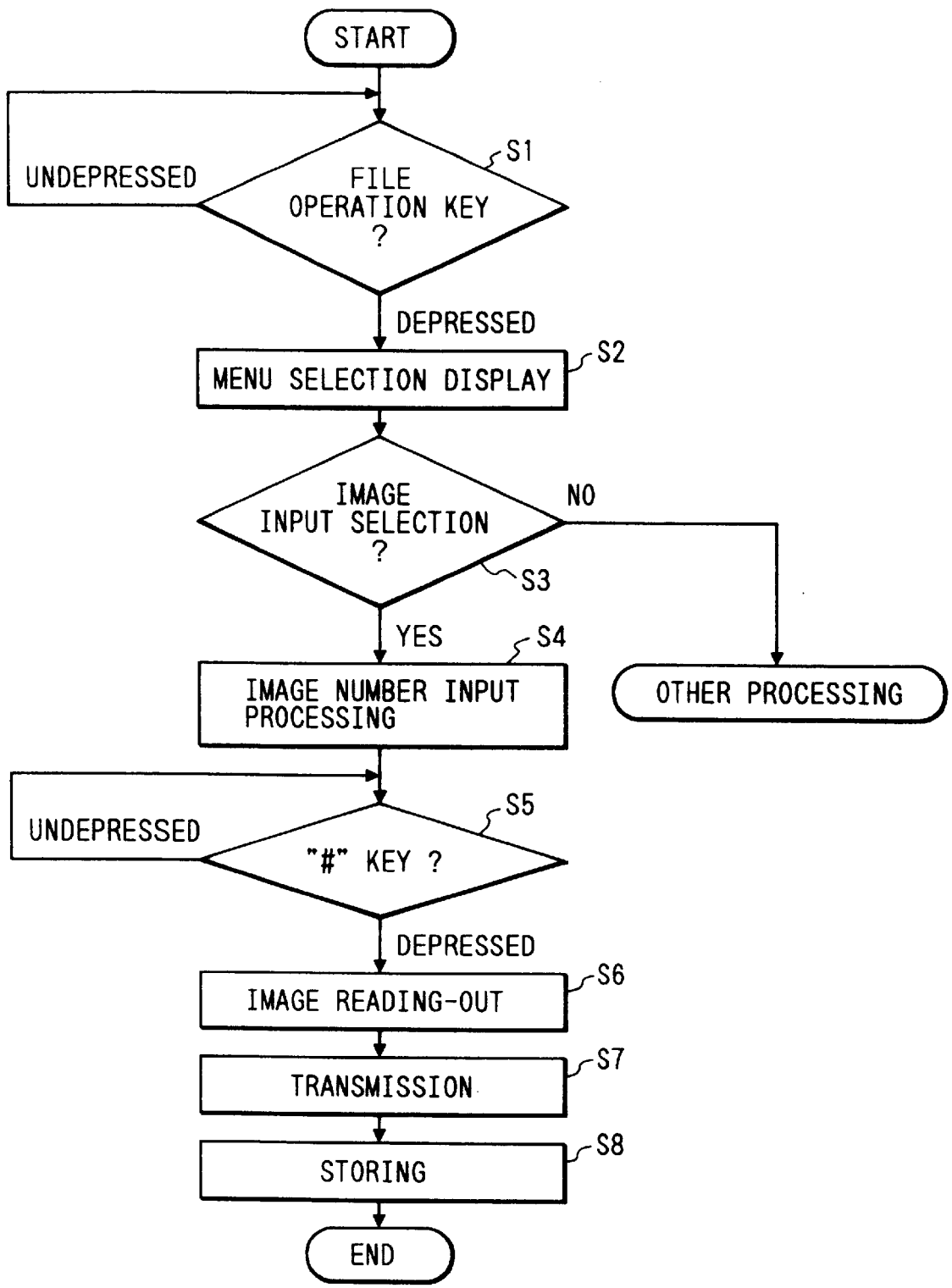

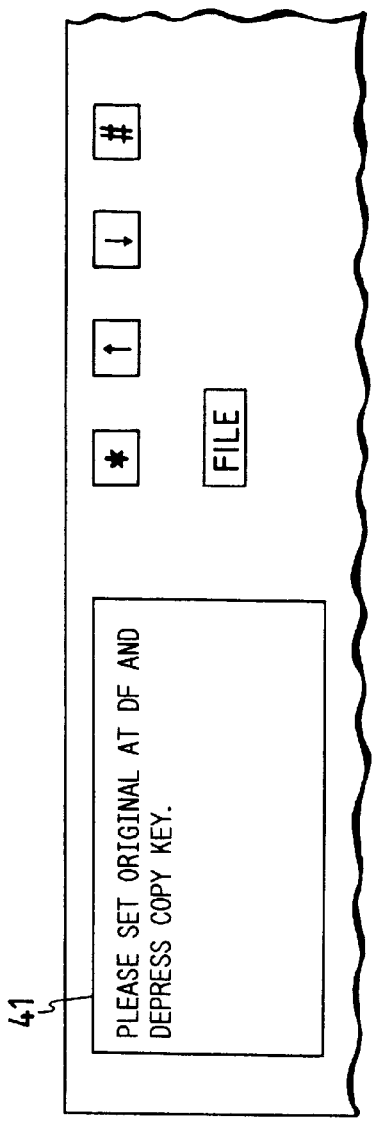
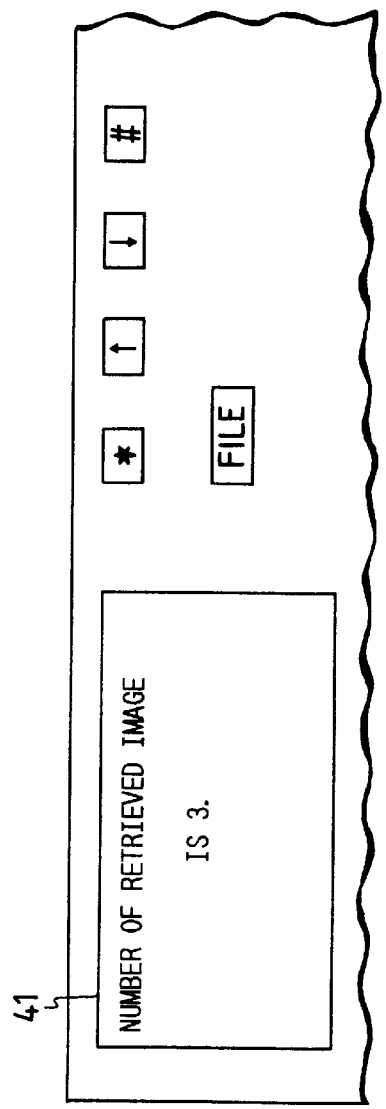

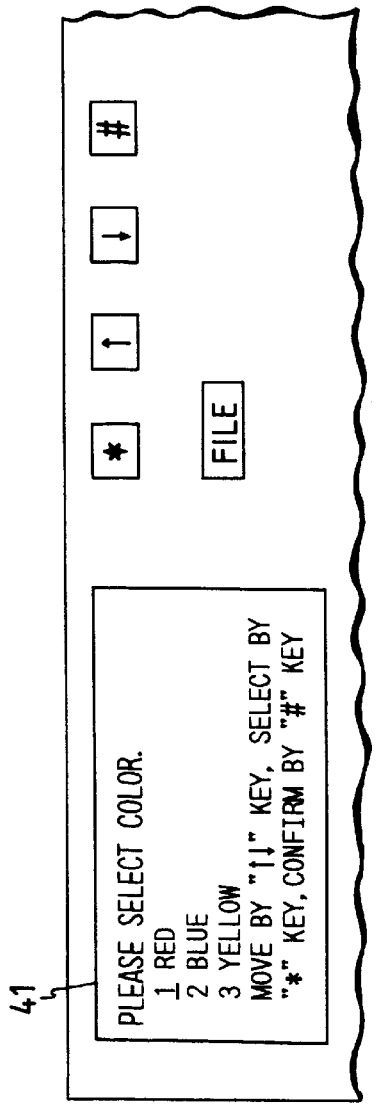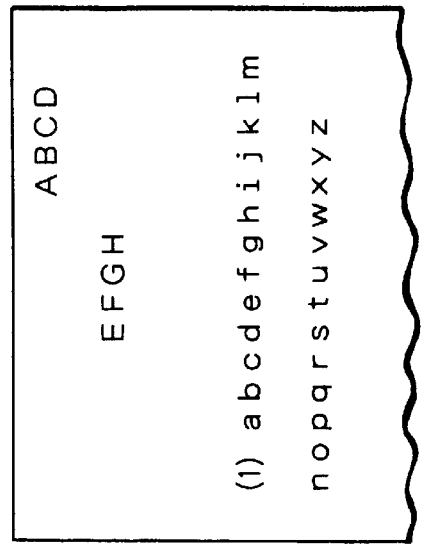

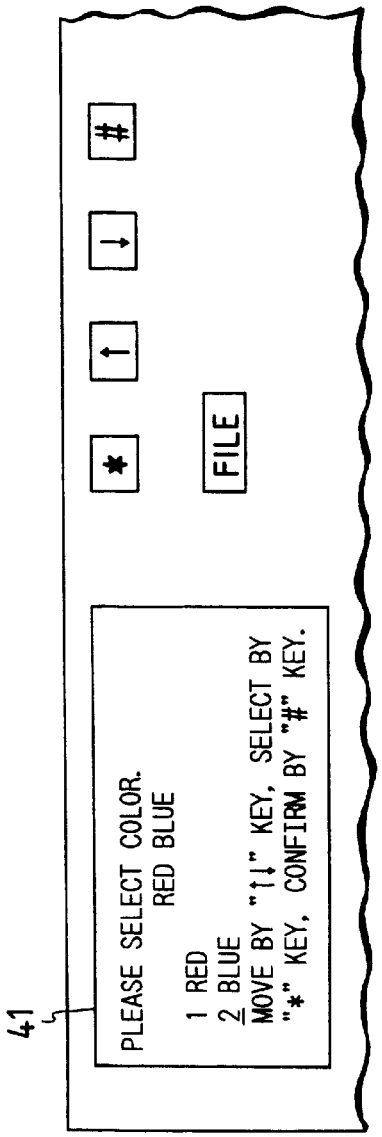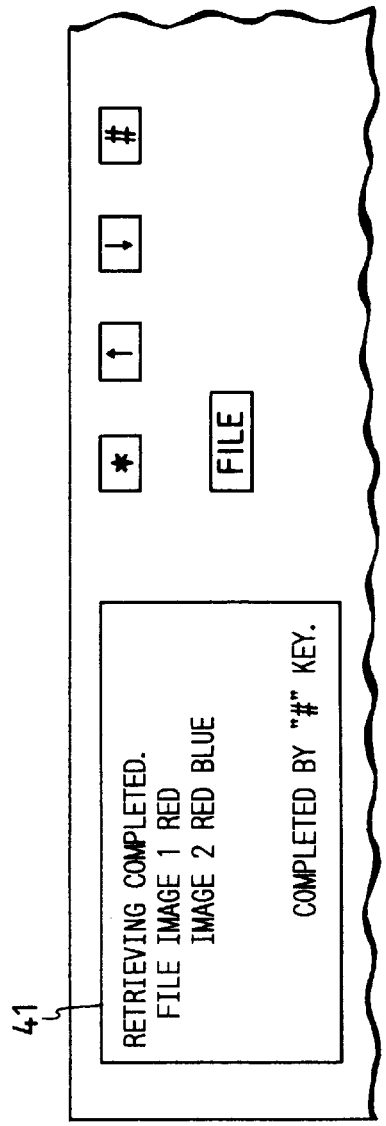

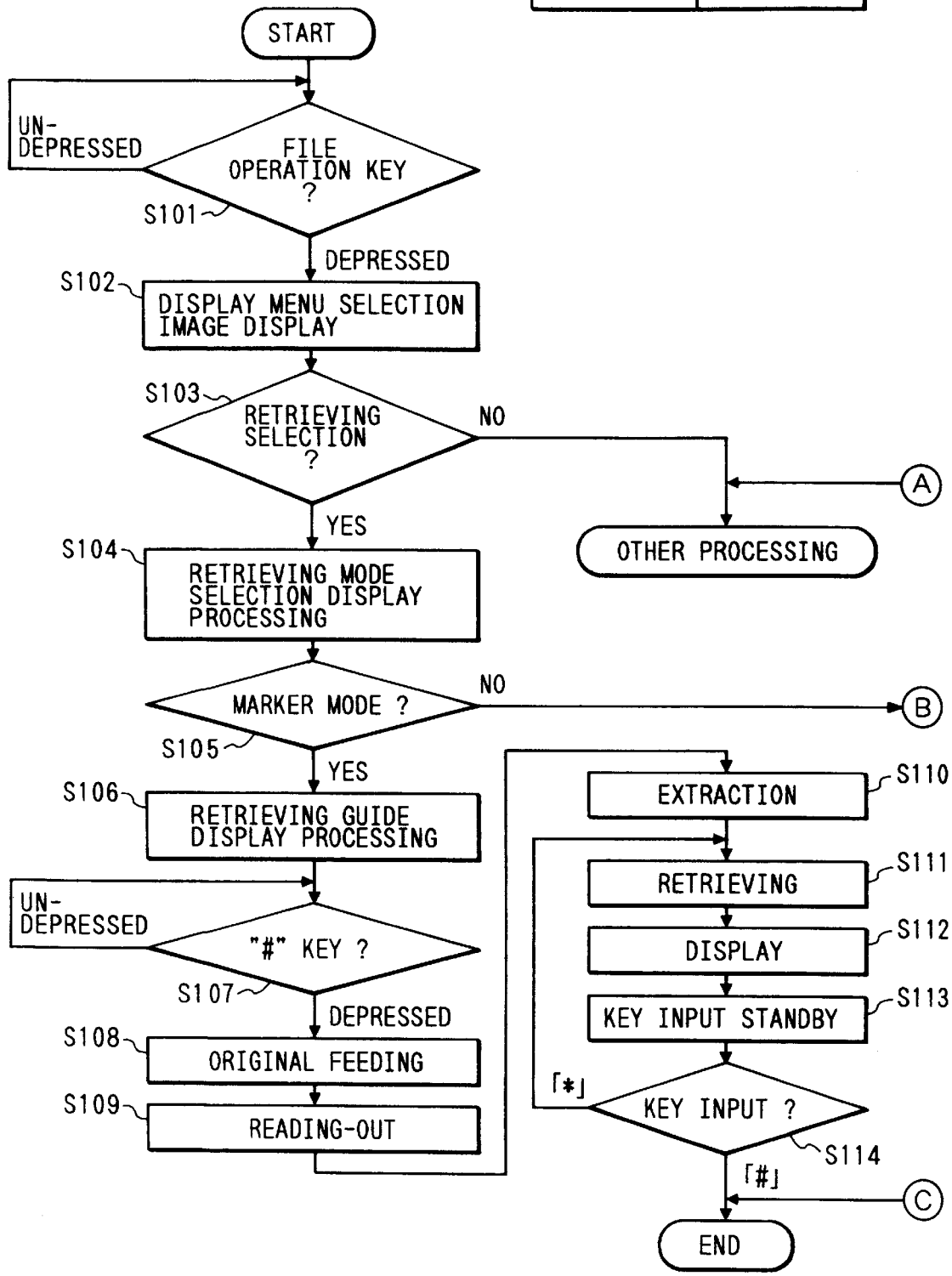

IMAGE RETRIEVING APPARATUS

This application is a continuation of application Ser. No. 07/921,118 filed Jul. 29, 1992, now abandoned.

BACKGROUND OF THE INVENTION

1. Field of the Invention

The present invention relates to an image retrieving apparatus for retrieving an image stored in a storage medium.

2. Related Background Art

In retrieving an image stored in a storage medium of a conventional electronic filing system, a file name or key word assigned when storing the image, is designated to display it on a display screen. A user visually confirms whether the retrieved and displayed image is a desired one. If it is a desired one, the image is printed out on a recording sheet, and if not another image is retrieved.

Such a conventional retrieving method is associated with very complicated works. If a user forgets the file name or key word of an image because it is impossible to reduce the number of image files to be checked, a very large number of image files are required to be read by trial and error.

In one method of eliminating such inconveniences, as disclosed in U.S. patent Ser. No. 038,239, images stored in a storage medium are reduced in size and stored as index images in the storage medium. A plurality of such index images are read at a time and displayed. A user designates an index image to read a desired image file.

With this method, however, if there are too many index images, efficient retrieval is not possible. If the number of index images to be displayed is to be reduced, a key word or the like is required to be entered for the retrieval of index images. Therefore, if a user forgets a key word, it is impossible to reduce the number of index images to be checked.

In another method of dealing with such inconveniences, as disclosed in U.S. patent Ser. Nos. 477,470, 478,250, 601,445 and the like, each image file is assigned an optional image index instead of a conventional character index (key word). In retrieving an image file, an image index is designated to obtain a desired image file.

With this method, an image index is required to be assigned to each image file in advance, in order to allow the retrieval using image indices. If such an image index is inadvertently not assigned to some image files, efficient retrieval is impossible.

SUMMARY OF THE INVENTION

It is an object of the present invention to provide an image retrieving apparatus eliminating the above-described disadvantages.

It is another object of the present invention to provide an image retrieving apparatus capable of retrieving an image file easily without designating a file name or key word.

It is a further object of the present invention to provide an image retrieving apparatus capable of retrieving a desired image file easily by entering an image characteristic contained in the desired image.

The above and other objects of the present invention will become apparent from the detailed description and claims when read in conjunction with the accompanying drawings.

According to an embodiment of the present invention, an original of an image to be retrieved is read. The read image is subjected to pattern matching with respect to a plurality of images stored in a storage medium for the image retrieval. Image data corresponding to an image in the storage medium and having a matched pattern is outputted from the storage medium, or an image serial number is displayed, thereby allowing an easy retrieval of a desired image file.

BRIEF DESCRIPTION OF THE DRAWINGS

FIG. 5 is a diagram showing an image selection screen on a display unit according to the first embodiment.

FIG. 6 is a diagram showing the image selection screen shown in FIG. 5 when an image serial number has been designated.

FIG. 7 is a flow chart showing a filing operation according to the first embodiment.

FIG. 10 is a diagram showing a guidance display when an image is retrieved according to the first embodiment.

FIG. 11 is a diagram showing a displayed retrieval result after an image has been retrieved according to the first embodiment.

FIG. 17 is a diagram showing a color selection screen on a display unit according to the third embodiment.

FIG. 18 is a diagram showing an example of an original to be retrieved according to the third embodiment.

FIG. 21 is a diagram showing a multi-color selection screen according to the fourth embodiment.

FIG. 22 is a diagram showing a displayed retrieval result after an image has been retrieved according to the fourth embodiment.

DETAILED DESCRIPTION OF THE PREFERRED EMBODIMENTS

Figure 1:
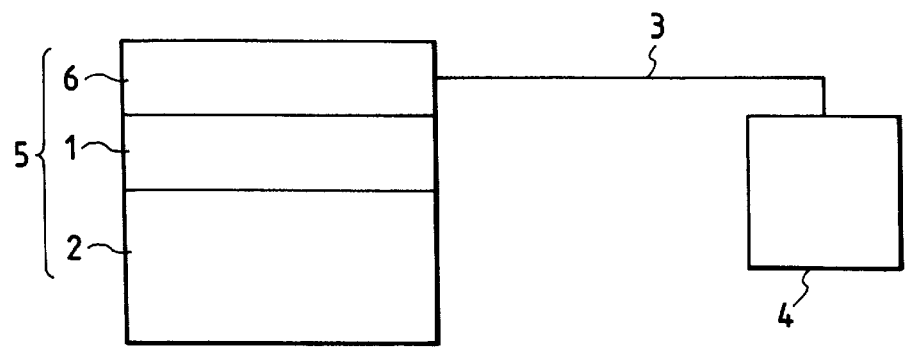
FIG. 1 is a block diagram showing the system configuration of a first embodiment of an image retrieving apparatus according to the present invention.

FIG. 1 is a block diagram showing the system configuration of the first embodiment according to the present invention. The image forming apparatus 5 of this system has a scanner 1, a printer 2, and an original feeding device (hereinafter called "DF") 6. In an ordinary case, an original set on DF 6 is fed to a read position of the scanner 1 which in turn reads the image of the original, and the read image data is printed by the printer 2 on a recording sheet. If the image data read by the scanner 1 is to be filed in a photomagnetic disc, the image data is transmitted via communication line 3 to a photomagnetic disc drive 4. The image forming apparatus of this embodiment can process a read image data in the form of digital signals, and can perform various image processing.

Figure 2:
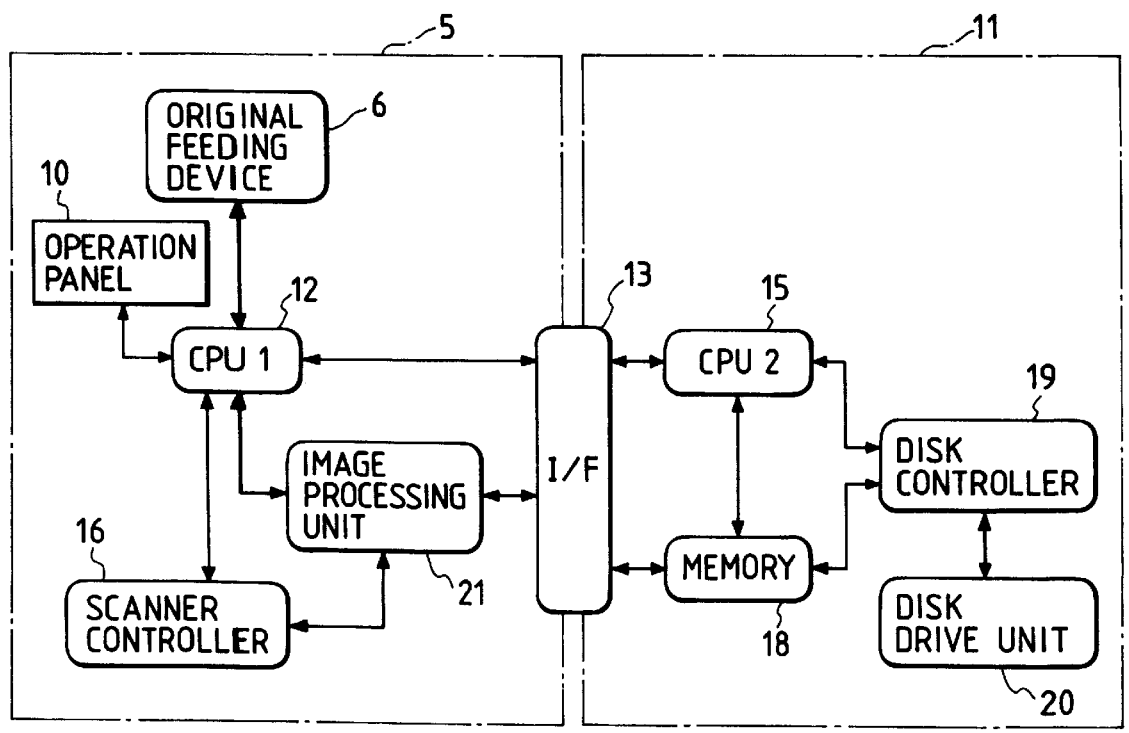
FIG. 2 is a block diagram showing the structure of the system portion executing a filing operation according to the first embodiment.

FIG. 2 is a block diagram showing the system portion for controlling the filing operation in the image forming apparatus.

The image forming apparatus 5 has a CPU 12 for controlling the entirety of the apparatus, an image processing unit 21 for executing various image data processing, a scanner controller 16 for controlling the scanner 1, and an operation panel 10 for entering various inputs and instructing to display various information.

On the photomagnetic disc drive 4 side, a filing unit 11 is provided. This filing unit 11 has a CPU 15 for controlling the entirety of the photomagnetic disc drive 4, a disc controller 19 for controlling the operation of the photomagnetic disc drive 4, a disc drive unit 20 for detachably mounting a photomagnetic disc and reading/writing data from and to a photomagnetic disc, and a memory 18 for developing image data.

The image forming apparatus 5 and the filing unit 11 are interconnected by a filing interface 13.

Figure 3:
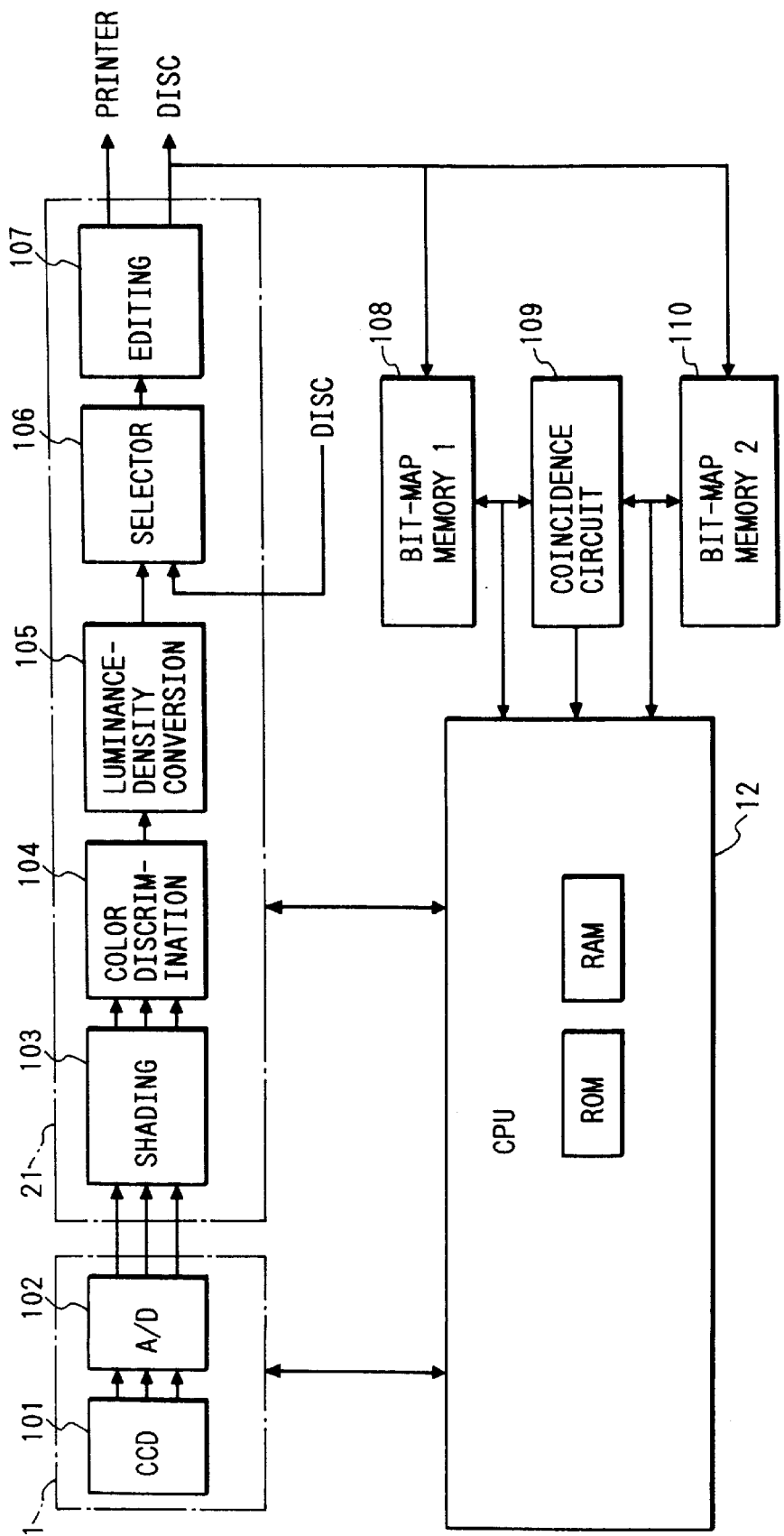
FIG. 3 is a block diagram showing the structure of a scanner, image processing unit and the like according to the first embodiment.

FIG. 3 is a block diagram showing the structure of the scanner 1, image processing unit 21 and the like of the image forming apparatus 5.

A CCD sensor 101 reads the image on a original and converts it into electrical signals (image signals) of three colors, red (R), green (G) and blue (B).

An A/D converter 102 converts an analog signal outputted from the CCD sensor 101 into a digital signal.

A shading correction unit 103 gives a shading correction to the digital signal outputted from the A/D converter 102. A color discrimination unit 104 discriminates a predetermined area indicated by a marker or the like on the original, in accordance with an output from the shading correction unit 103. The coordinate values read by the color discrimination unit 104 are stored in a RAM within CPU 12.

After the color discrimination unit 104 discriminates the predetermined color area, image data of the other color area except the discriminated and predetermined color area is inputted to a luminance-density conversion unit 105 which converts the image data into density data. The density data is multi-value image data having sixteen tonal levels for example. The value "0" is brightest and the value "15" is darkest.

Next, the multi-value image data is inputted to a selector 106 which selects either the image data inputted from the scanner 1 or the image data read from a photomagnetic disc.

An editing unit 107 compares the density of each pixel of the image data selected by the selector 106, with a predetermined threshold value, to convert the image data into binary image data, analyzes the spatial frequency of an image to separate an original image into a character data area, a half tone area and a dot area, or separately picks up only the marker designated image area discriminated by the color discrimination unit 104.

The image data outputted from the editing unit 107 is supplied to two bit-map memories 108 and 110. More specifically, the image data from the scanner 1 is supplied to the bit-map memory 108, whereas the image data from a photomagnetic disc is supplied to the bit-map memory 110. A coincidence circuit 109 checks through pattern matching of each bit whether the two image data developed on the memories 108 and 110 are coincident with each other.

Figure 4:
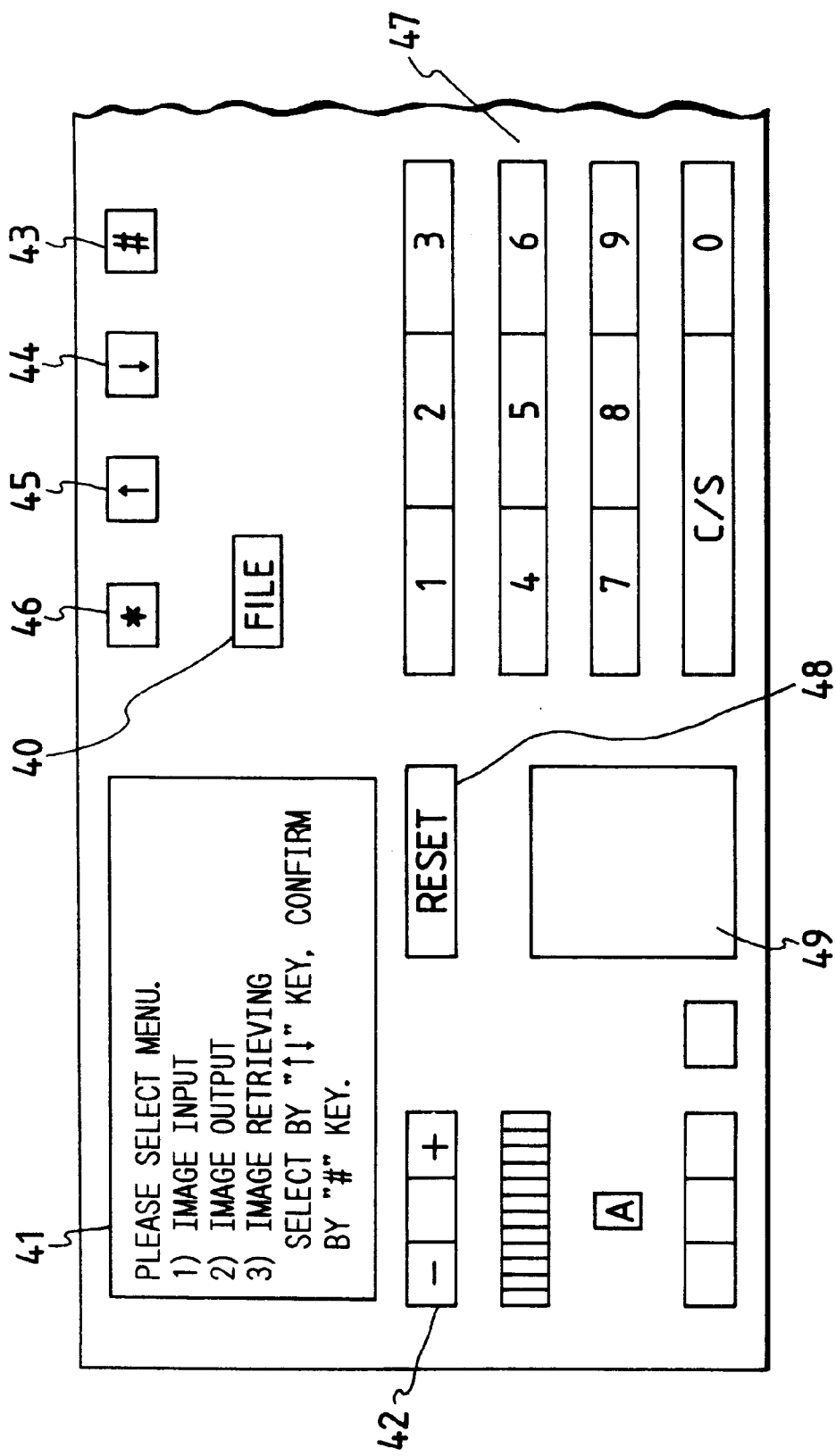
FIG. 4 is a diagram showing the layout of an operation panel according to the first embodiment.

FIG. 4 is a diagram showing the layout of the operation panel.

The operation panel 10 has a file operation key 40 for instructing to file image data, an LCD display unit 41 for displaying various operation screens, a magnification/reduction key 43, cursor/set keys 43 to 46, ten-keys 47, a reset key 48, a start key 49 and etc. An operation screen for the image forming apparatus is normally displayed on the LCD display unit 41.

Next, the operation of the image forming apparatus will be described.

FIG. 7 is a flow chart showing the image data filing operation.

First, a file operation key 40 of the operation panel 10 is depressed (step S1) to display a menu selection screen shown in FIG. 4 on the display unit 41 (step S2). When an image input event is selected (step S3), an image serial number input screen shown in FIG. 5 is displayed (step S4). An image serial number "3" for example is entered by using one of the ten-keys 47 (refer to FIG. 6). Upon depression of a "#" key 43 (step S5), the image input operation is executed for the image of one or a plurality of originals placed on DF6 (step S6).

CPU 12 operates to transmit the multi-value image data read by the scanner 1 to the filing unit 11 via the image processing unit 21 and filing interface 13 (step S7). CPU 15 on the filing unit 11 side operates to store the image data in the form of multi-value in the photomagnetic disc set on the disc drive unit 20, via the disc controller 19 (step S8).

Figure 8:
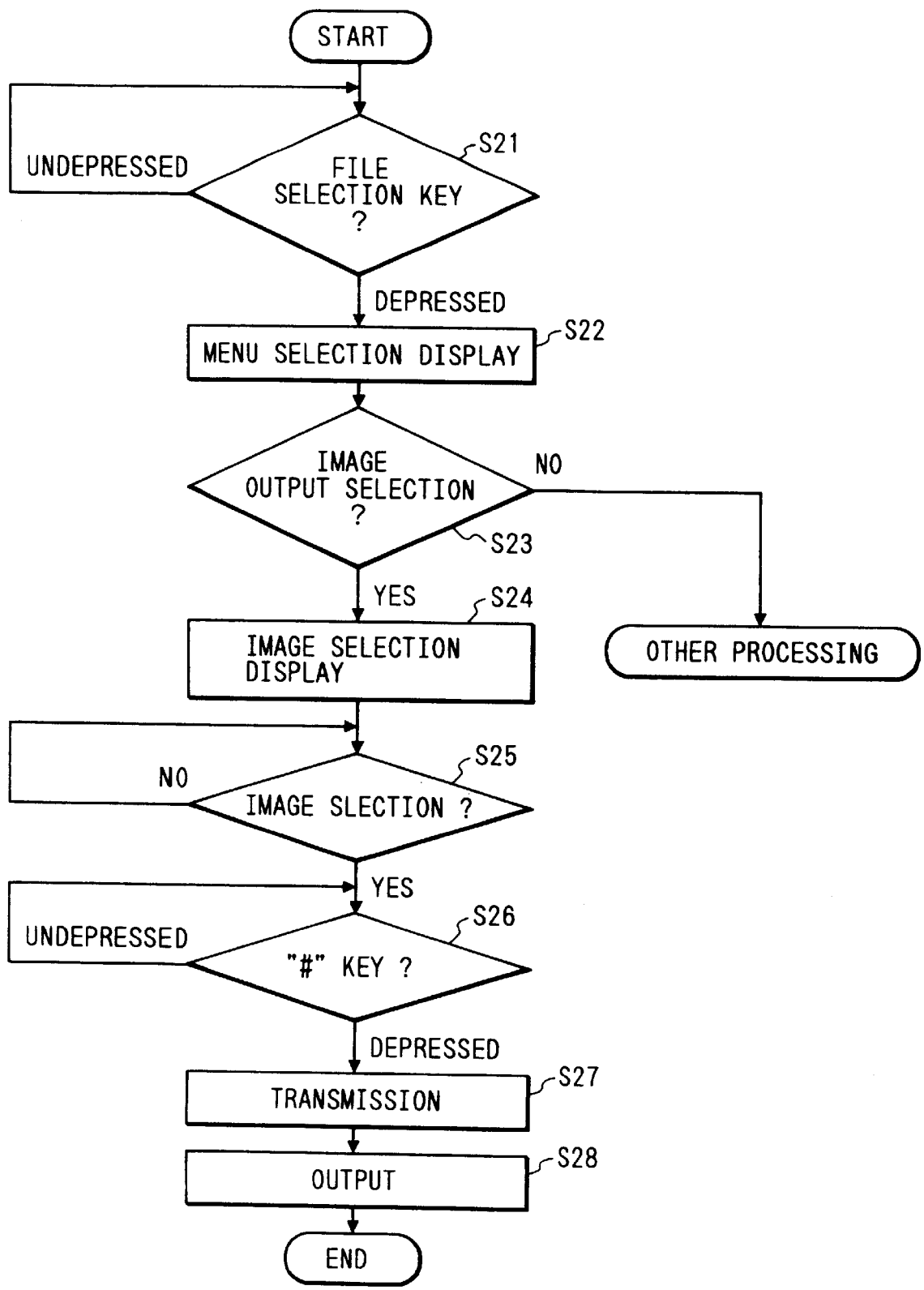
FIG. 8 is a flow chart showing an image output operation according to the first embodiment.

FIG. 8 is a flow chart showing the image output operation.

First, the file operation key 40 of the operation panel 10 is depressed (step S21) to display the menu selection screen shown in FIG. 4 (step S22). When an image output event is selected (step S23), the image selection screen shown in FIG. 5 is displayed (step S24). Desired image data is selected as illustrated in FIG. 6 (step S25). Upon depression of the "#" key 43 (step S26), CPU 12 operates to read the image data stored in the photomagnetic disc and transmits it to the image processing unit 21 via the filing interface 13 (step 27). CPU 12 then operates to output the image data to the printer 2 (step S28).

Figure 9:
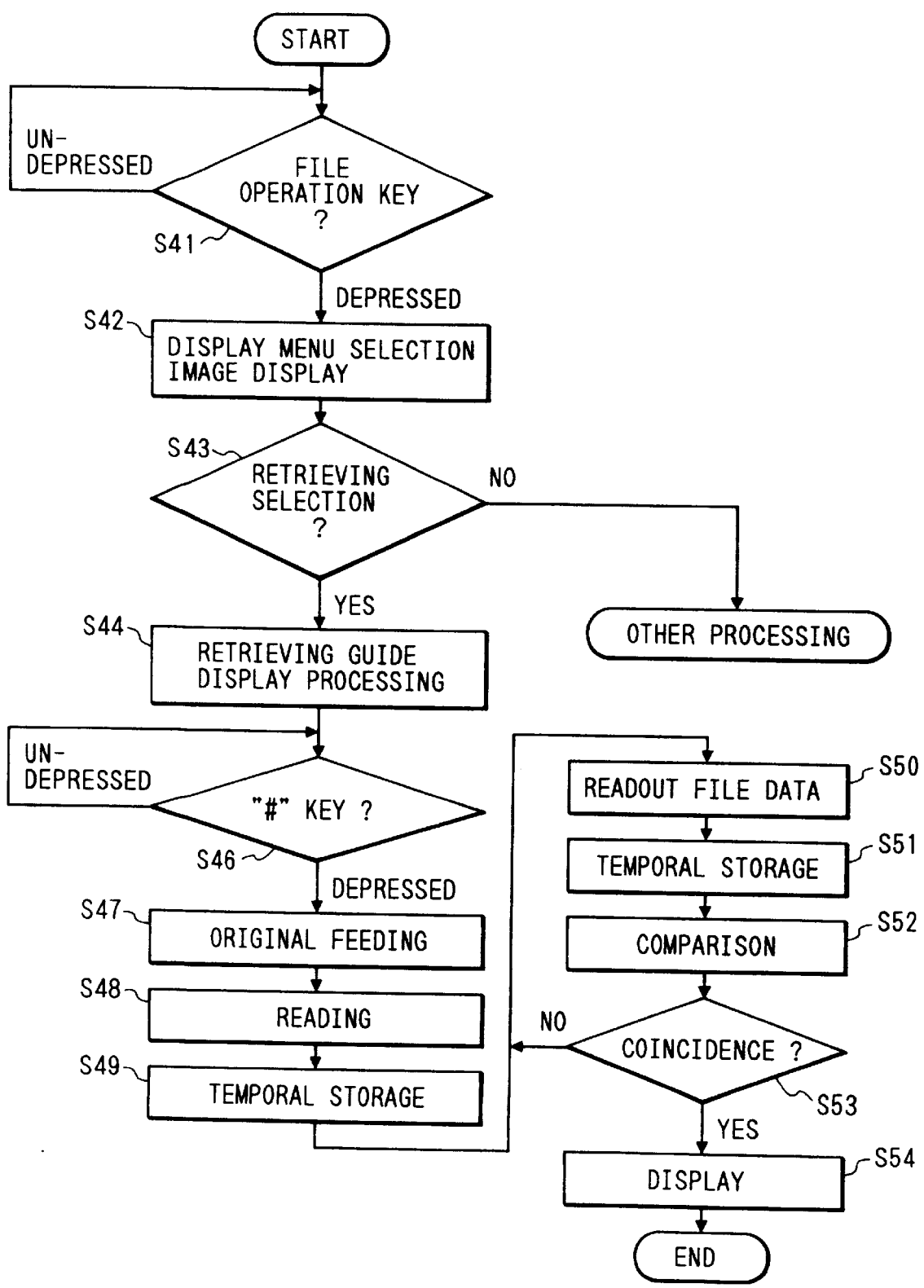
FIG. 9 is a flow chart showing an image retrieving operation according to the first embodiment.

FIG. 9 is a flow chart showing the image file retrieving operation.

First, the file operation key 40 is depressed (step S41) to display the menu selection screen shown in FIG. 4 (step S42). When an image retrieval event is selected (step S43), an image retrieval guidance screen shown in FIG. 10 is displayed (step S44). An original with an image to be retrieved is placed on DF6 and a copy key ("#" key 43) is depressed (step S46).

In response to the depression, CPU 12 operates to instruct DF6 to set the original image to the image read position (step S47). The scanner controller 16 causes the scanner 1 to start scanning to read the original image by CCD 101 (step S48). The multi-value image data is stored via the image processing unit 21 into the bit-map memory 108 (step S49).

CPU 12 then passes the control to CPU 15 via the interface 13. The first multi-value file image data stored in the photomagnetic disc is read under the control of the disc controller 19 (step S50), sent to the selector 106 of the image processing unit 21 via the memory 18 and interface 13, and stored in the bit-map memory 110 (step S51).

The contents stored in the bit-map memories 108 and 110 are compared with each other by the coincidence circuit 109 (step S52). If both the image data are not coincident, the image data stored in the photomagnetic disc are sequentially read and set in the bit-map memory 110, and compared with the image data in the bit-map memory 108, until a coincidence is obtained (step S53).

In this comparison process, a coincidence may be determined if all bits of the two images are coincident, or if 90% of all image data is coincident. An original image to be retrieved may be a full page or part of the image stored in the disc.

Upon reception of a coincidence signal from the coincidence circuit 109, CPU 12 operates to display the image serial number of the image data determined as coincident on the display unit 41 as shown in FIG. 11 (step S54). As described above, an original with an image to be retrieved is read by the scanner 1 so that it is possible to retrieve a desired image data without visually checking the image data stored in the photomagnetic disc.

In the above embodiment, in retrieving image file data, the entirety of the original image data to be retrieved is compared with the entirety of the image file data stored in the photomagnetic disc. Instead, an original corresponding only to a front page may be read as the original image data to be retrieved, and compared with the first page data of each image file stored in the magnetic disc.

The latter method can be realized by reading only the first page image data of each file at step S50 shown in FIG. 9, the other operations being the same as described in the above embodiment. With only the first page, the image data retrieval can be speeded up, and moreover the capacity of the bit-map memories 108 and 110 can be reduced cost effectively.

Furthermore, in the above embodiment, although the comparison between image data of the multi-value type is performed, image data after compression may be used for the comparison. In this case, the multi-value image data read at step S48 in FIG. 9 is compressed to a binary image data by the editing unit 107 and stored in the bit-map memory 108. The multi-value image data read from the photomagnetic disc at step S50 in FIG. 9 is compressed to the binary image data and stored in the bit-map memory 110. Thereafter, both the compressed image data are compared to retrieve the coincident image data in the manner similar to the above embodiment. It is therefore possible to reduce the amount of data to be compared and speed up the retrieval process. It is also possible to reduce the capacity of the bit-map memories 108 and 110 cost effectively.

As described above, an image can be retrieved by reading an original image to be retrieved and comparing it with an image of each file. Therefore, even if a user forgets a file name, a desired file can be easily retrieved.

Furthermore, only a particular page or compressed data may be used for the comparison between images, thereby reducing the time required for the retrieval, the capacity of bit-map memories, and the apparatus cost.

It is possible to retrieve an image in the above-described manner while also using conventional character or image index information.

Figure 12:
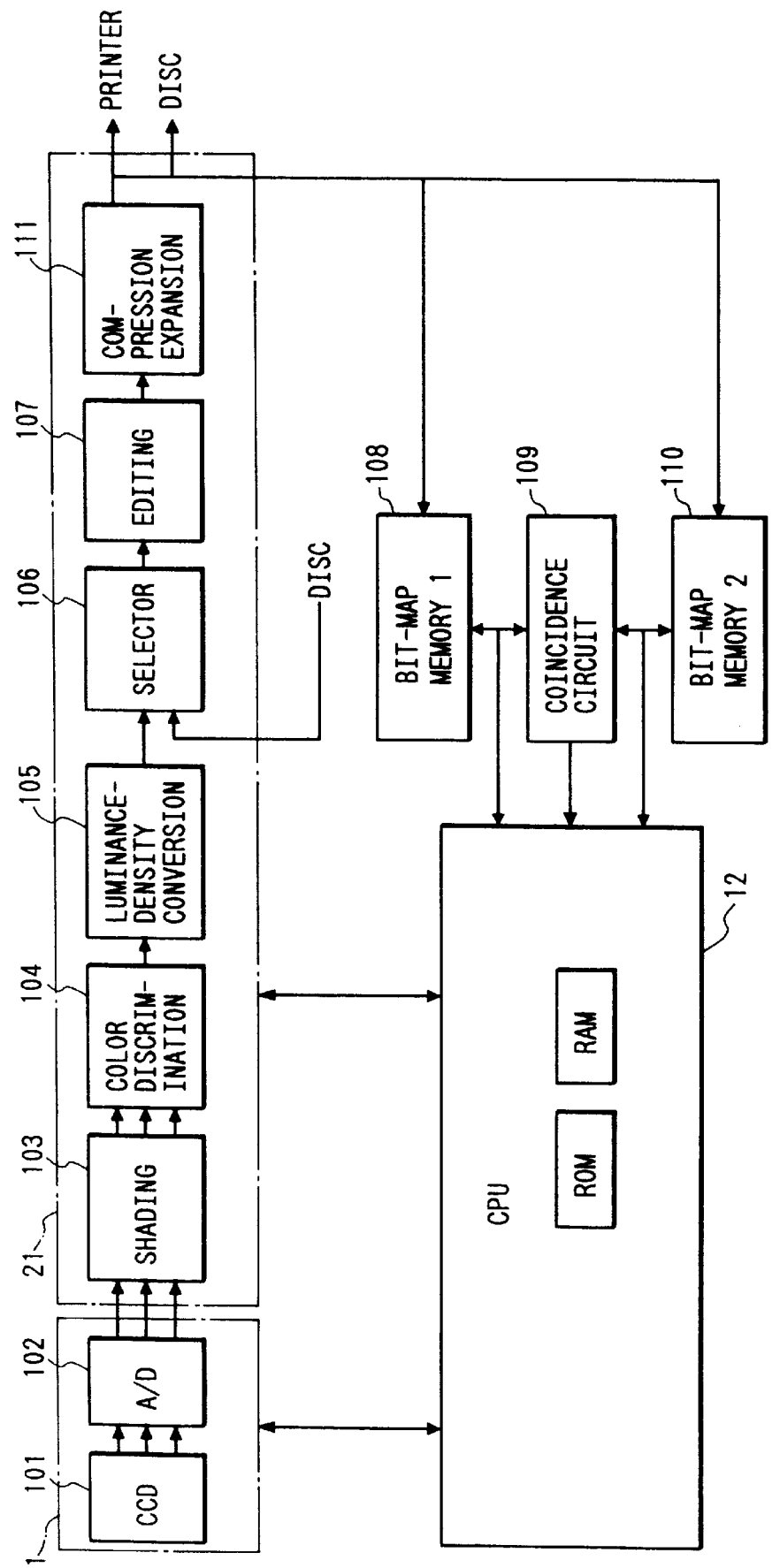
FIG. 12 is a block diagram showing the structure of a scanner, image processing unit and the like according to a second embodiment of the present invention.

FIG. 12 is a block diagram showing the structure of a scanner, image processing unit and the like according to the second embodiment. Like elements to those shown in FIG. 3 are represented by using identical reference numerals, and the description thereof is omitted. The different point of the embodiment shown in FIG. 12 from FIG. 3 is the provision of a compression/expansion unit 111 having a function of compressing image data to be stored in a disc and expanding image data read from the disc.

Figure 13:
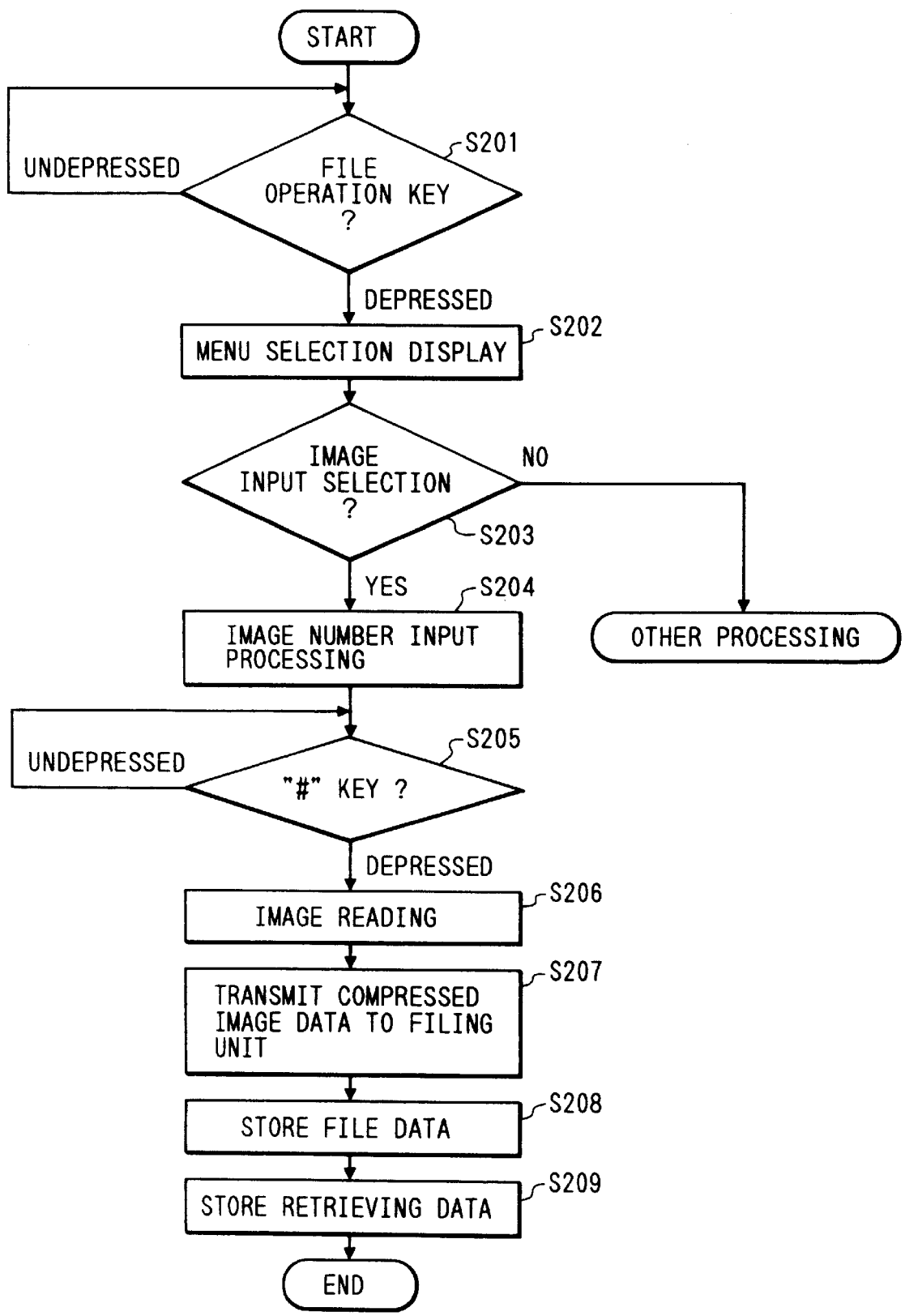
FIG. 13 is a flow chart showing a filing operation according to the second embodiment.

FIG. 13 is a flow chart showing the image filing operation according to the second embodiment.

First, the file operation key 40 of the operation panel 10 is depressed (step S201) to display the menu selection screen shown in FIG. 4 on the display unit 41 (step S202). When an image input event is selected (step S203), the image serial number input screen shown in FIG. 5 is displayed (step S204). An image serial number "3" for example is entered by using one of the ten-keys 47 (refer to FIG. 6). Upon depression of the "#" key 43 (step S205), the image input operation is executed for the image of one or a plurality of originals placed on DF6 (step S206).

CPU 12 operates to cause the compression/expansion unit 111 of the image processing unit 21 to compress the image data read by the scanner 1 and transmit the compressed image data to the filing unit 11 via the filing interface 13 (step S207). CPU 15 on the filing unit 11 side operates to store the compressed image data in the photomagnetic disc set on the disc drive unit 20, via the disc controller 19 (step S208). The compressed image data of the first page read by the scanner 1 is stored not only in the general file storage area of the photomagnetic disc, but also in the retrieval data area thereof as the retrieval data (step S209). An address corresponding to the file in the photomagnetic disc is given to the retrieval data.

Figure 14:
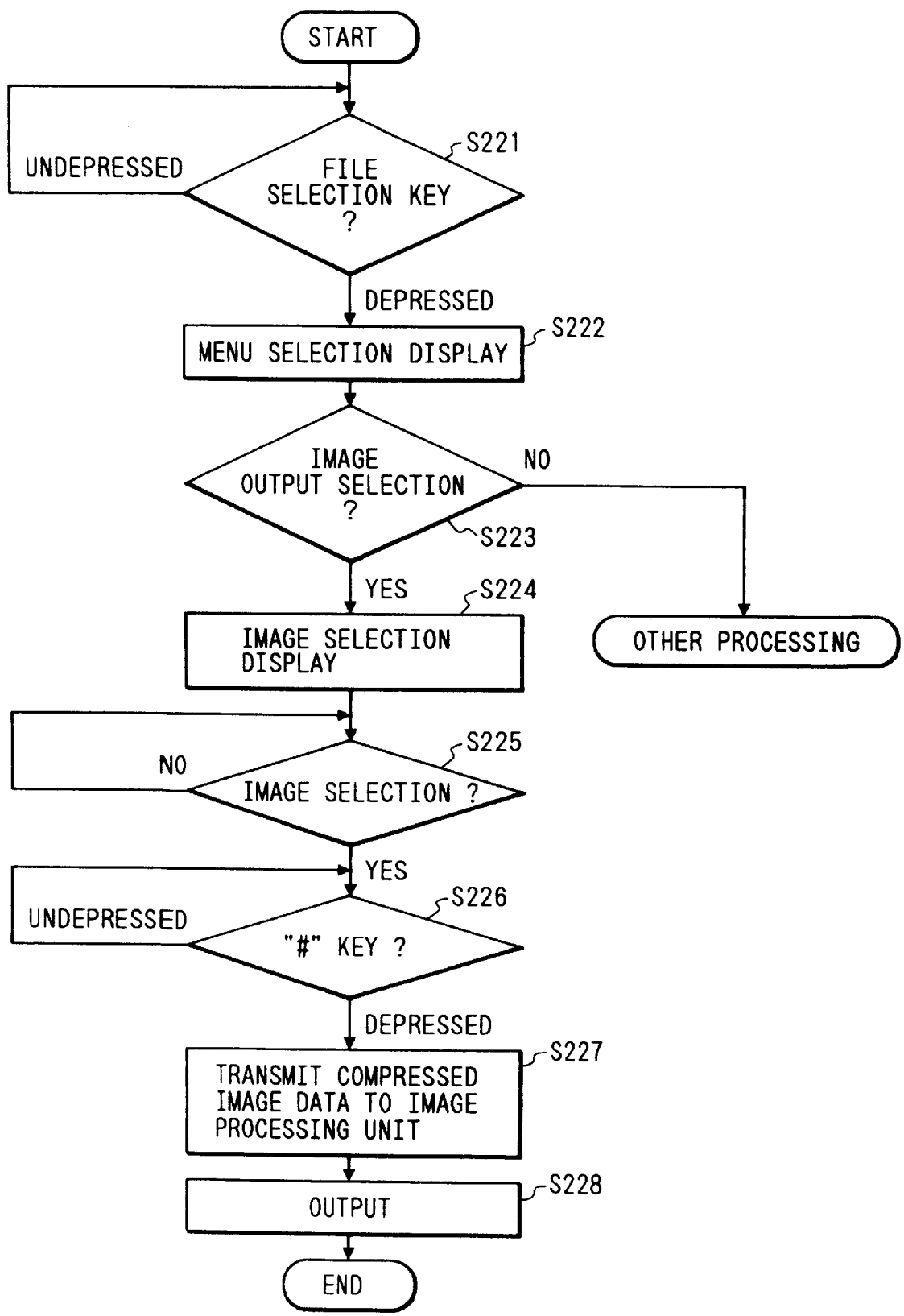
FIG. 14 is a flow chart showing an image output operation according to the second embodiment.

FIG. 14 is a flow chart showing the image output operation according to the second embodiment.

First, the file operation key 40 is depressed (step S221) to display the menu selection screen shown in FIG. 4 (step S222). When an image output event is selected (step S223), the image selection screen shown in FIG. 5 is displayed (step S224). Desired image data is selected as illustrated in FIG. 6 (step S225). Upon depression of the "#" key 43 (step S226), CPU 12 operates to read the compressed image data stored in the photomagnetic disc and transmits it to the image processing unit 21 via the filing interface 13 (step S227). The compressed image data is expanded by the compression/expansion unit 111, and CPU 12 operates to output the expanded image data to the printer 2 (step S228).

Figure 15:
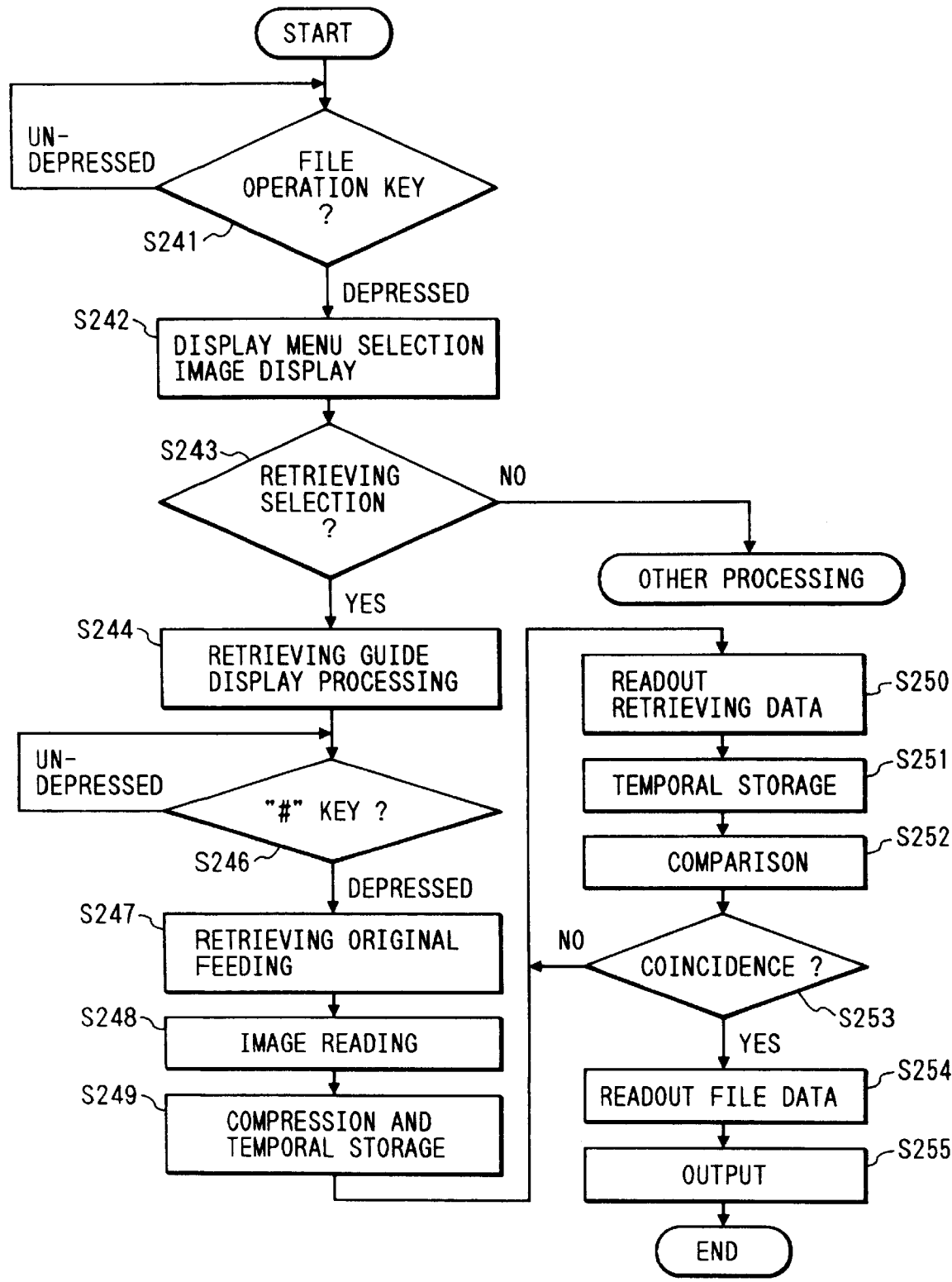
FIG. 15 is a flow chart showing an image retrieving operation according to the second embodiment.

FIG. 15 is a flow chart showing the image file retrieving operation according to the second embodiment.

In this embodiment, in filing an original having a plurality of pages, a user takes charge of the image of the first page as the retrieval original. In retrieving a file, the retrieval original is read by the scanner 1 and compared with the stored retrieval image data through pattern matching.

First, the file operation key 40 is depressed (step S241) to display the menu selection screen shown in FIG. 4 (step S242). When an image retrieval event is selected (step S243), the image retrieval guidance screen shown in FIG. 10 is displayed (step S244). An original with an image to be retrieved is placed on DF6 and the copy key ("#" key 43) is depressed (step S246).

In response to the depression, CPU 12 operates to instruct DF6 to set the original image to the image read position (step S247). The scanner controller 16 causes the scanner 1 to start scanning to read the original image by CCD 101 (step S248). The compressed image data is stored via the image processing unit 21 into the bit-map memory 108 (step S249).

CPU 12 then passes the control to CPU 15 via the interface 13. The first page compressed retrieval image data stored in the photomagnetic disc at the retrieval data area is read under the control of the disc controller 19 (step S250), sent to the selector 106 of the image processing unit 21 via the memory 18 and interface 13, and stored in the bit-map memory 110 (step S251).

The contents stored in the bit-map memories 108 and 110 are compared with each other by the coincidence circuit 109 (step S252). If both the image data are not coincident, the image data stored in the photomagnetic disc at the retrieval image data area are sequentially read and set in the bit-map memory 110, and compared with the image data in the bit-map memory 108, until a coincidence is obtained (step S253).

Upon reception of a coincidence signal representative of a near coincidence from the coincidence circuit 109, CPU 12 operates to read the image file corresponding the image data determined as coincident from the photomagnetic disc at its general file storage area, and send it to the image processing unit 21 (step S254). The received image file is expanded and sequentially printed out by the printer 2 (step S255).

In the above description, a retrieved image file is automatically printed out. However, a serial number of the retrieved file may be displayed on the display unit 41 and a user determines either to print out the image file or to display it.

In the above embodiment, in filing an original having a plurality of pages, a user takes charge of the image of the first page as the retrieval original. It is therefore possible to reduce the amount of data to be used for the comparison, thereby speeding up the file retrieval. Furthermore, both the compressed image data are compared without expanding them in the file retrieval, thereby reducing the amount of data to be used for the comparison and further speeding up the file retrieval. The capacity of the bit-map memories 108 and 110 can be reduced cost effectively.

Figure 16:
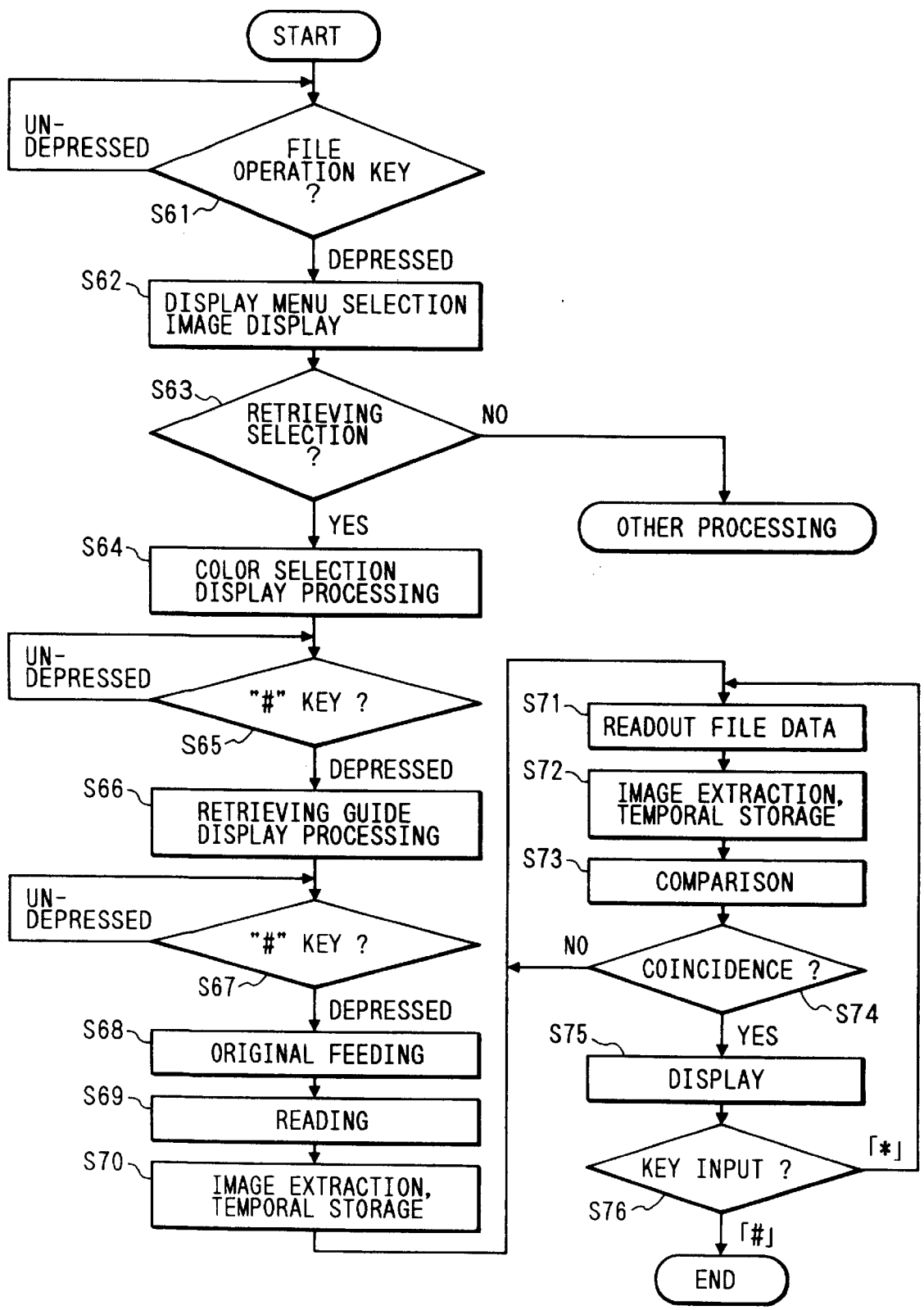
FIG. 16 is a flow chart showing an image retrieving operation according to a third embodiment of the present invention.

FIG. 16 is a flow chart showing the image file retrieving operation according to the third embodiment.

In this embodiment, in retrieving an image file, a retrieval original is used which is provided with a designated retrieval color. The retrieval original with a designated retrieval color is read by the scanner 1 to pick up the position data of a color designated area and its image data which are stored in a memory. Using the picked-up position data, the image of each page at the color designated area is sequentially extracted from a photomagnetic disc and compared with each retrieval original color image through pattern matching, in order to retrieve a desired image file coincident with the original image file. In this embodiment, all pages of an image file are subject to pattern matching, and a particular retrieval image data as in the second embodiment is not used. The other filing operation and output operation are the same as the second embodiment, and the description thereof is omitted.

First, the file operation key 40 is depressed (step S61) to display the menu selection screen shown in FIG. 4 (step S62). When an image retrieval event is selected (step S63), a color selection screen shown in FIG. 17 is displayed (step S64). After a color is designated, the "#" key 43 is depressed (step S65) to display the retrieval guidance screen shown in FIG. 10 (step S66). An original with an image to be retrieved is placed on DF6 and the "#" key 43 is depressed (step S67).

FIG. 18 shows an example of the retrieval original. Only the characters "A B C D" at the upper right of the original are read. It is assumed at step S65 that a color "red" has been designated.

In response to the depression, CPU 12 operates to instruct DF6 to set the original image to the image read position (step S68). The scanner controller 16 causes the scanner 1 to start scanning to read the original image by CCD 101 (step S69). The read character area designated at step S65 is discriminated by the color discrimination unit 104, the position data of each pixel of the color designated image is stored in RAM, and the color designated image data is extracted by the editing unit 107 and stored in the bit-map memory 108 (step S70).

CPU 12 then passes the control to CPU 15 via the interface 13. The image data stored in the photomagnetic disc at the general file storage area is read under the control of the disc controller 19 (step S71), sent to the editing unit 107 via the memory 18, interface 13, and the selector 106 of the image processing unit 21. The editing unit 107 extracts the image area corresponding to the read image pixel area, the extracted image data being stored in the bit-map memory 110 (step S72).

The contents stored in the bit-map memories 108 and 110 are compared with each other by the coincidence circuit 109 (step S73). If both the image data are not coincident, the image data stored in the photomagnetic disc at the retrieval image data area are sequentially read and set in the bit-map memory 110, and compared with the image data in the bit-map memory 108, until a coincidence is obtained (step S74).

Figure 19:
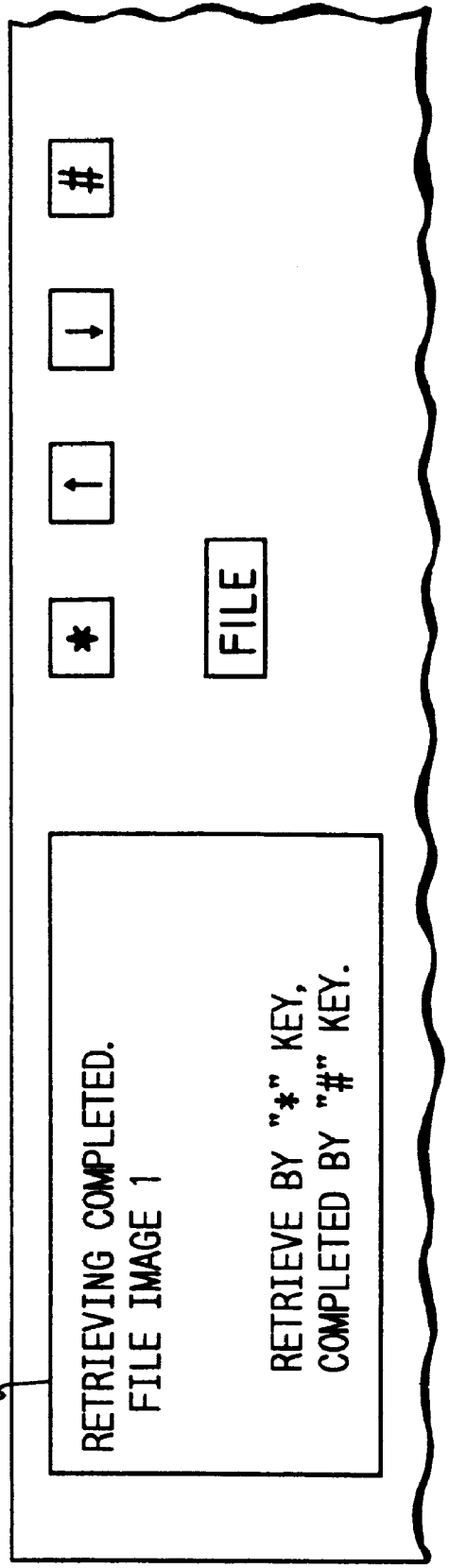
FIG. 19 is a diagram showing a displayed retrieval result after an image has been retrieved according to the third embodiment.

Upon reception of a coincidence signal representative of a near coincidence from the coincidence circuit 109, CPU 12 operates to displays the serial number of the image file considered as coincident, as shown in FIG. 19 (step S75). If another image file is to be retrieved, the "*" key 46 is depressed, and if the file retrieval is to be terminated, the "#" key 43 depressed (step S76). In the former case, the control returns back to step S71 to retrieve a new image file. By repeating the above operations, all image files considered coincident can be retrieved.

The retrieved file is outputted basing upon the file serial number obtained at step S75 and the procedure shown in FIG. 14.

In the third embodiment, all file data stored in the general file storage area are retrieved. However, like the second embodiment, only the first page retrieval data prepared when filing an image may be retrieved.

Figure 20:
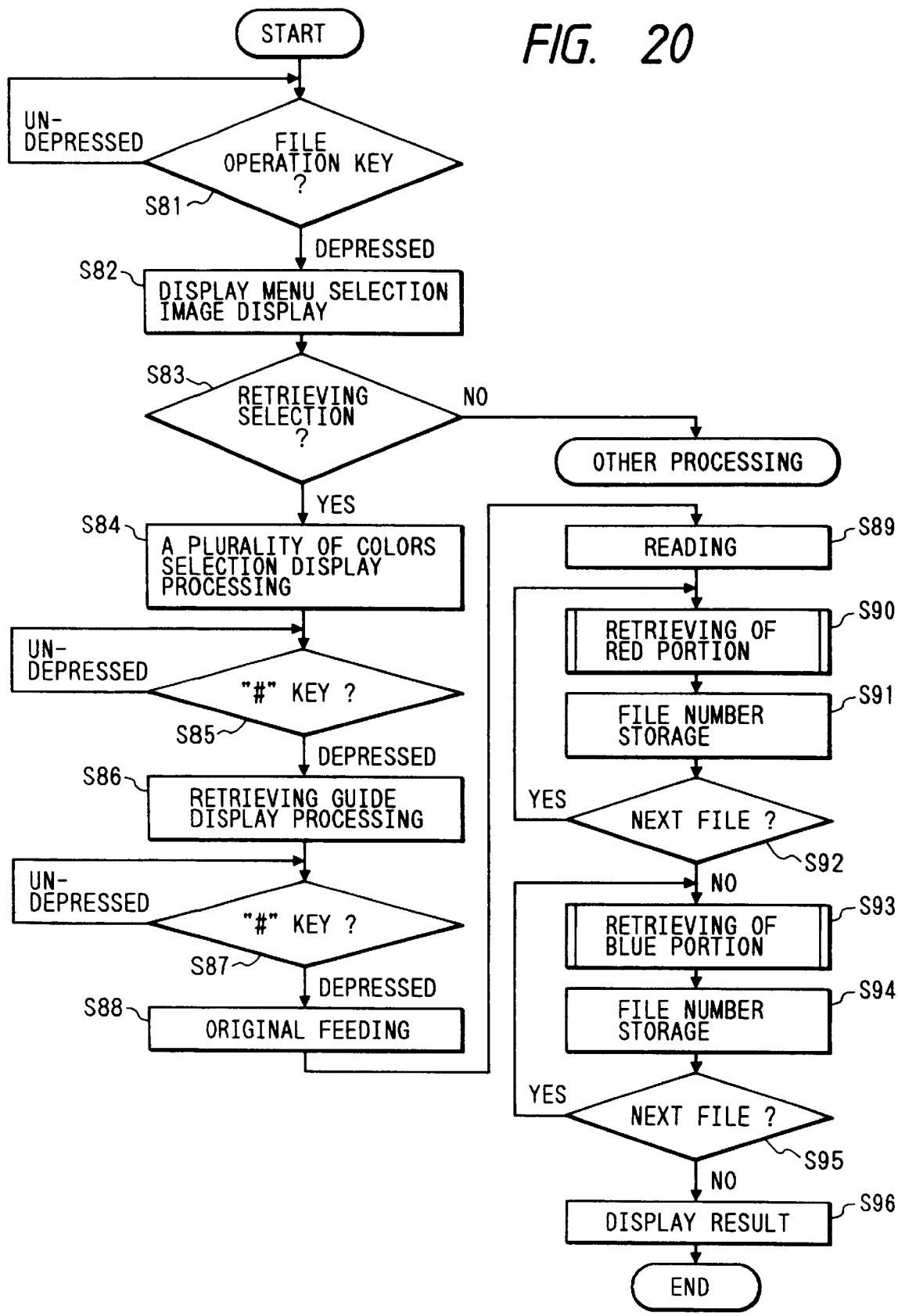
FIG. 20 is a flow chart showing an image retrieving operation according to a fourth embodiment of the present invention.

FIG. 20 is a flow chart showing the file retrieval operation wherein a plurality of colors are designated, according to the fourth embodiment of the present invention.

In the following, it is assumed that the characters "A B C D" at the upper right of a retrieval original shown in FIG. 18 are red, and the characters "E F G H" at the center thereof are blue.

First, the file operation key 40 is depressed (step S81) to display the menu selection screen shown in FIG. 4 (step S82). When an image retrieval event is selected (step S83), a multi-color selection screen shown in FIG. 21 is displayed (step S84). The cursor keys 44 and 45 are moved and the "*" key 46 is depressed to designate colors. In this example, the colors "red" and "blue" are designated, and the color designation is completed by depressing the "#" key 43 (step S85) to display the retrieval guidance screen shown in FIG. 10 (step S86). An original with an image to be retrieved is placed on DF6 and the "#" key 43 is depressed (step S87).

In response to the depression, CPU 12 operates to instruct DF6 to set the original image to the image read position (step S88). The scanner controller 16 causes the scanner 1 to start scanning to read the original image by CCD 101 (step S89). First the red color area is discriminated by the color discrimination unit 104. Similar to the control of the second embodiment, in accordance with the position data of the red color area, the red color data is compared with each image file stored in the photomagnetic disc through pattern matching to retrieve a desired image file (step S90). In this embodiment, all files are checked (step S92) and the serial numbers of files considered coincident are sequentially stored in RAM (step S91).

After completion of the file retrieval for the red image area, the blue image area is used for the file retrieval in the same manner described above (steps S93 to S95).

After the file retrieval operation, the retrieved results are displayed as shown in FIG. 22 (step S96). In FIG. 22, an "image 1" file has a coincidence of only the red image area, and an "image 2" file has a coincidence of both the red and blue image areas. The file retrieval operation is then terminated.

Figure 23B:
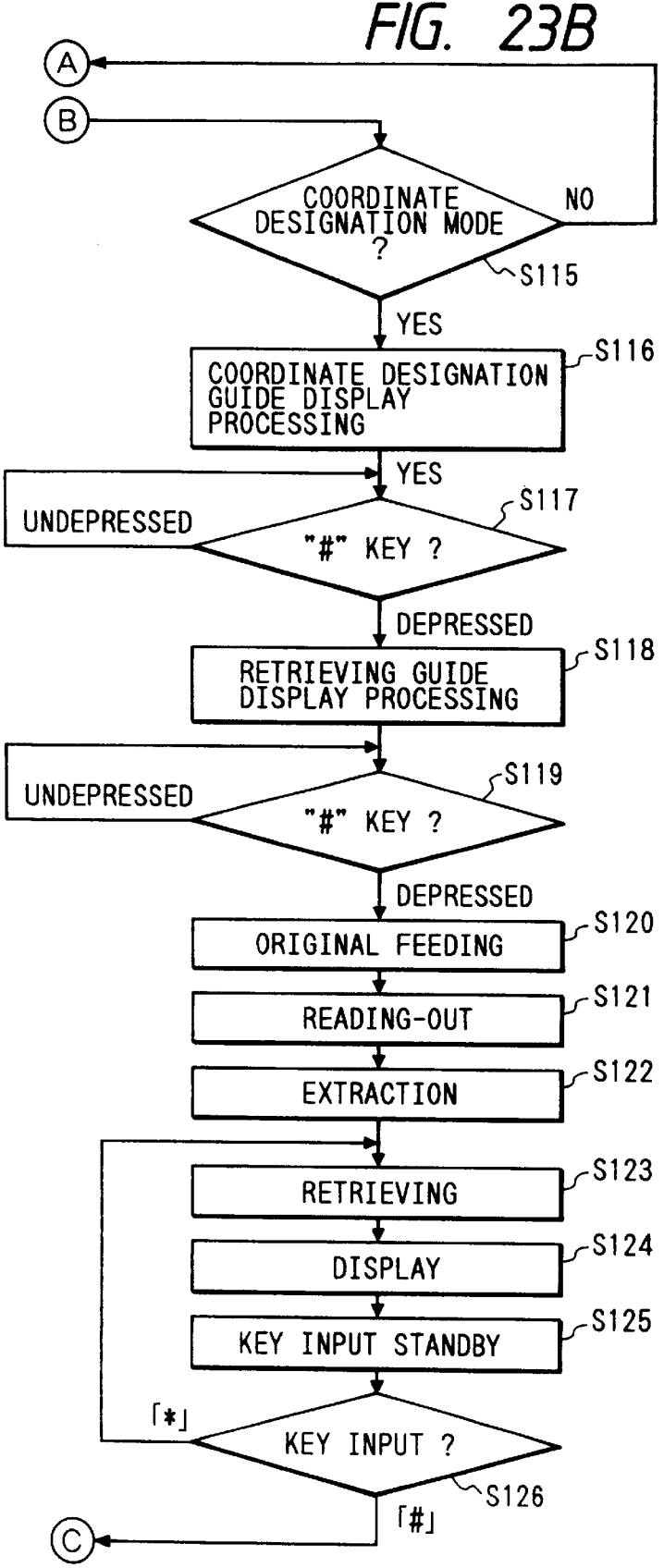
FIG. 23 is a flow chart showing the outline of an image retrieving operation according to a fifth embodiment of the present invention.

FIG. 23 is a flow chart showing the file retrieval operation according to the fifth embodiment of the present invention. In the fifth embodiment, instead of retrieving a file by designating a color image area as in the third embodiment, a retrieval image with an area designated by a color marker or a coordinate value input is read and compared through pattern matching to retrieve a desired image file.

Figure 24:
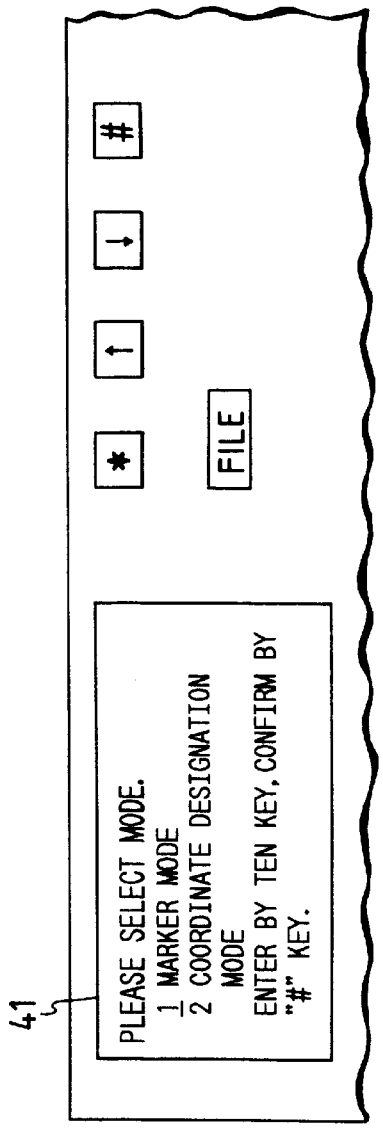
FIG. 24 is a diagram showing a retrieval mode selection screen on a display unit according to the fifth embodiment.

First, the file operation key 40 is depressed (step S101) to display the menu selection screen shown in FIG. 4 (step S102). When an image retrieval event is selected (step S103), a retrieval mode selection screen shown in FIG. 24 is displayed (step S104). When a marking mode is selected, a retrieval process using an area designation by a marker pen is executed, and when a coordinate value designation mode is selected, a retrieval process using an area designation by a coordinate value input is executed.

First, the operation when the marking mode is selected will be described. In FIG. 24, when the cursor key is moved to a marking mode event and the "#" key 43 is depressed, the control advances to the marking mode (step S105) to display the retrieval guidance screen shown in FIG. 10 (step S106). In response to this screen, an operator places an original with a retrieval image area having been designated with a marker pen on DF6 and depresses the "#" key 43 (step S107).

Figure 25:
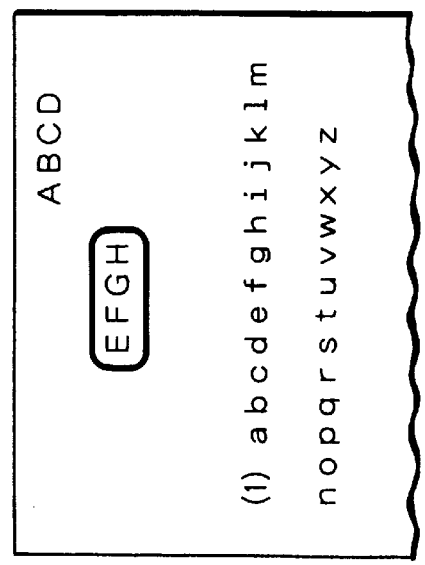
FIG. 25 is a diagram showing an example of an original with an image retrieving area being indicated by a marker according to the fifth embodiment.

FIG. 25 is a schematic diagram showing an example of an original with a retrieval image area having been designated by a marker. A retrieval image area can be designated by surrounding this area by a line drawn with a predetermined color marker pen.

In response to the depression, CPU 12 operates to instruct DF6 to set the original image to the image read position (step S108). The scanner controller 16 causes the scanner 1 to start scanning to read the original image by CCD 101 (step S109). First the marked image area is discriminated by the color discrimination unit 104. The image data surrounded by a line drawn with a marker pen is extracted by the editing unit 107 (step S110). Thereafter, similar to the control operation of the third embodiment, the extracted retrieval image data is compared with each image file stored in the photomagnetic disc through pattern matching to retrieve a file considered coincident (step S111). In this embodiment, if there is a file considered coincident, the serial number of the file is displayed on the display unit (step S112) and the retrieval operation is temporarily stopped (step S113). If an operator intends to continue a further retrieval operation, the "*" key 46 is depressed (step S114) to return to step S111 and resume the retrieval operation. If an operator intends to terminate the retrieval operation, the "#" key 43 is depressed (step S114).

Figure 26:
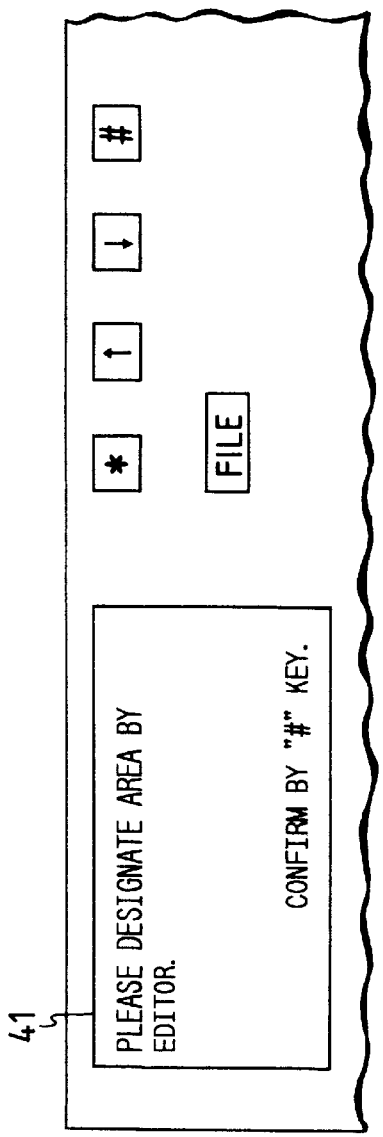
FIG. 26 is a diagram showing a coordinate designation guidance screen on a display unit according to the fifth embodiment.
Figure 27:
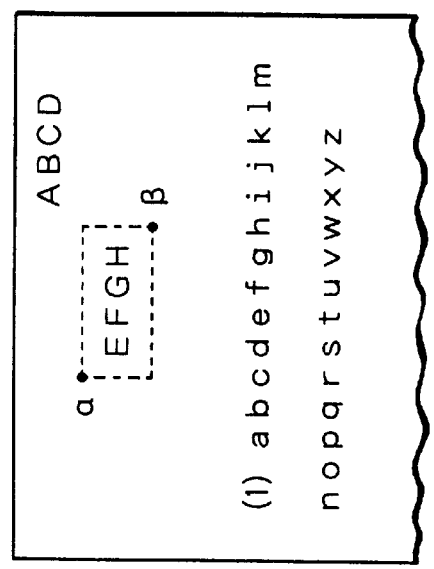
FIG. 27 is a diagram showing an example of an original with an image retrieving area being indicated by coordinate values according to the fifth embodiment.

Next, the operation when the coordinate value designation mode is selected will be described. In the display screen shown in FIG. 24, when the cursor key is moved to the coordinate value designation mode and the "#" key 43 is depressed, the control advances to the coordinate value designation mode (step S115) to display a coordinate value designation guidance screen shown in FIG. 26 (step S116). In response to this screen, an operator places an original on an editor (not shown), designates coordinate values of opposite corners on a diagonal line of a rectangular retrieval image area such as shown in FIG. 27, and depresses the "#" key 43 (step S117). In this manner, the coordinate value data of the image area indicated by a broken line in FIG. 27 is stored in CPU 12. Next, the retrieval guidance screen shown in FIG. 10 is displayed (step S118). In response to this screen, an operator places the original with the coordinate values having been designated on DF6 and depresses the "#" key 43 (step S119).

In response to the depression, CPU 12 operates to instruct DF6 to set the original image to the image read position (step S120). The scanner controller 16 causes the scanner 1 to start scanning to read the original image by CCD 101 (step S121). By using the coordinate data obtained by the editor, the image data at the designated area is extracted by the editing unit 107 (step S122). Thereafter, similar to the control operation of the third embodiment, the extracted retrieval image data is compared with each image file stored in the photomagnetic disc through pattern matching to retrieve a file considered coincident (step S123). If there is a file considered coincident, the serial number of the file is displayed on the display unit (step S124) and the retrieval operation is temporarily stopped (step S125). If an operator intends to continue a further retrieval operation, the "*" key 46 is depressed (step S126) to return to step S123 and resume the retrieval operation. If an operator intends to terminate the retrieval operation, the "#" key 43 is depressed (step S126).

In the above embodiments, the file retrieval through pattern matching has been performed on the assumption that a retrieval original and an image file stored in the photomagnetic disc has the same size. In the case of difference sizes, the size of either the retrieval original or the image file is changed to make it have the same size of the other. Thereafter, the same operation as the above embodiments is carried out to retrieve a desired image file.

Figure 28:
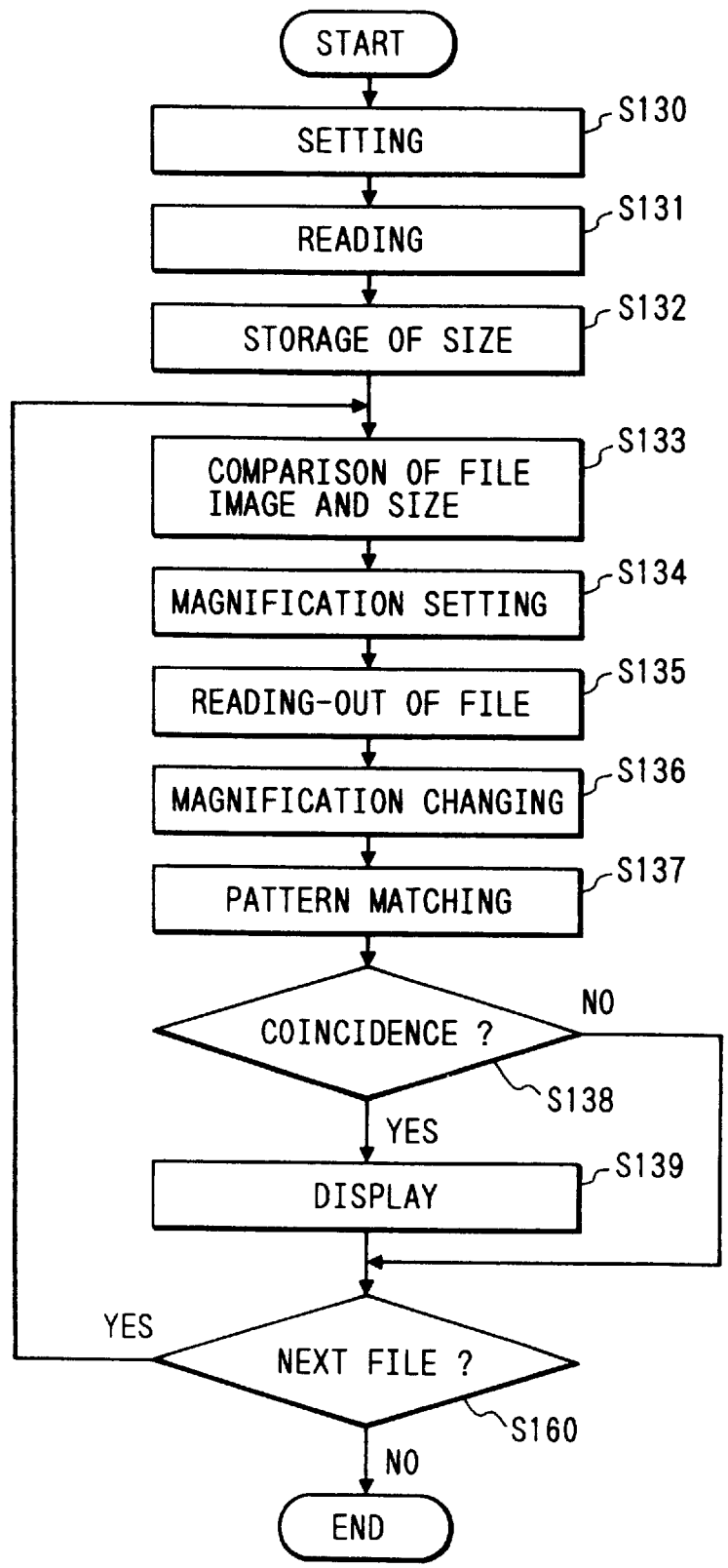
FIG. 28 is a flow chart showing the outline of an image retrieving operation according to a sixth embodiment of the present invention.

FIG. 28 is a flow chart showing the outline of the operation while scaling the size during the retrieval operation, according to the sixth embodiment of the present invention.

After the setting operation necessary for the file retrieval is performed in accordance with any one of the above embodiment methods (step S130), a retrieval image original is read (step S131). The setting operation necessary for the file retrieval means a selection of the image retrieval mode in the first and second embodiments, a color designation after selecting the image retrieval mode in the third and fourth embodiments, and a selection of the image retrieval mode or area designating mode and a coordinate value designation in the fifth embodiment.

When reading the retrieval image original, the size of the original is detected and stored in RAM (step S132). The size of an original may be detected by various known methods. For example, the size can be detected by sensors mounted on original feeding paths of DF6. In the retrieval operation by any one of the embodiment methods, image data are sequentially read from the photomagnetic disc. Prior to this read operation, the size of the file image data to be read is detected and compared with the size of the retrieval image original (step S133). If the size is a different from that of the retrieval image original, the scale factor or magnification changing factor is calculated and set to the editing unit 107 (step S134).

The file image data is read from the photomagnetic disc (step S135). The editing unit 107 performs a necessary image extracting operation as well as a magnification changing operation (step S136) to make the file image data have the same size of the retrieval image original and execute pattern matching (step S137).

Thereafter, the retrieval results are displayed and other necessary operations are performed in accordance with any one of the above embodiment methods (steps S138, S139). Calculating a magnification changing factor is carried out each time the serial number of a file to be read from the photomagnetic disc is renewed, to thus execute a process suitable for the size of an image file (step S160).

In the above manner, it becomes possible to perform a retrieval operation by using a retrieval image original having a different size from that of an image file. It is possible to use a retrieval image original having a reduced size, requiring a smaller space for taking custody of it.

In the sixth embodiment, the size of an image file is changed. Instead, the larger size of either the image file or the retrieval image original may be reduced to have the same size as the smaller one. This case will be described as the seventh embodiment of the present invention.

Figure 29:
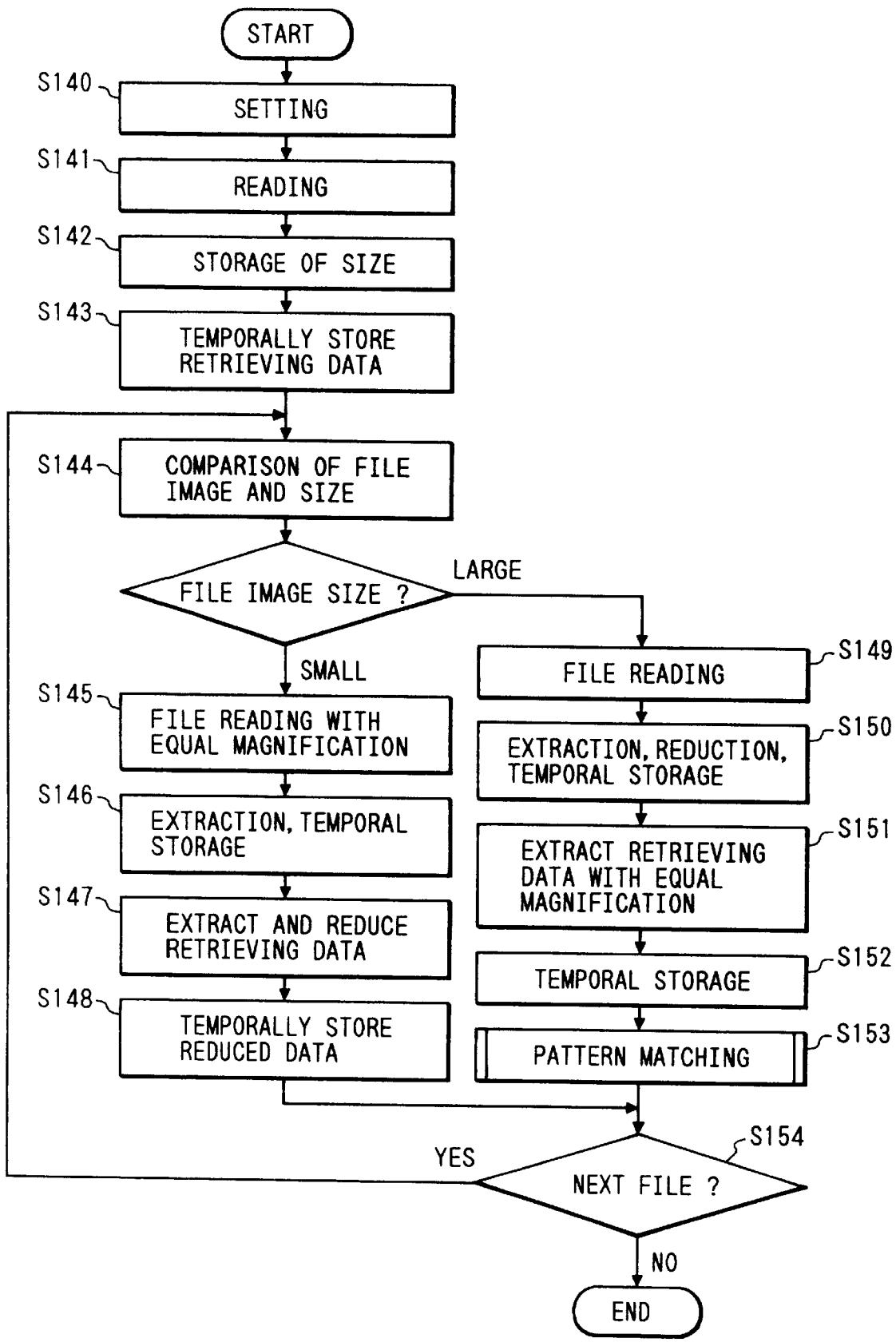
FIG. 29 is a flow chart showing the outline of an image retrieving operation according to a seventh embodiment of the present invention.

FIG. 29 is a flow chart showing the outline of the operation according to the seventh embodiment of the present invention.

Figure 30:
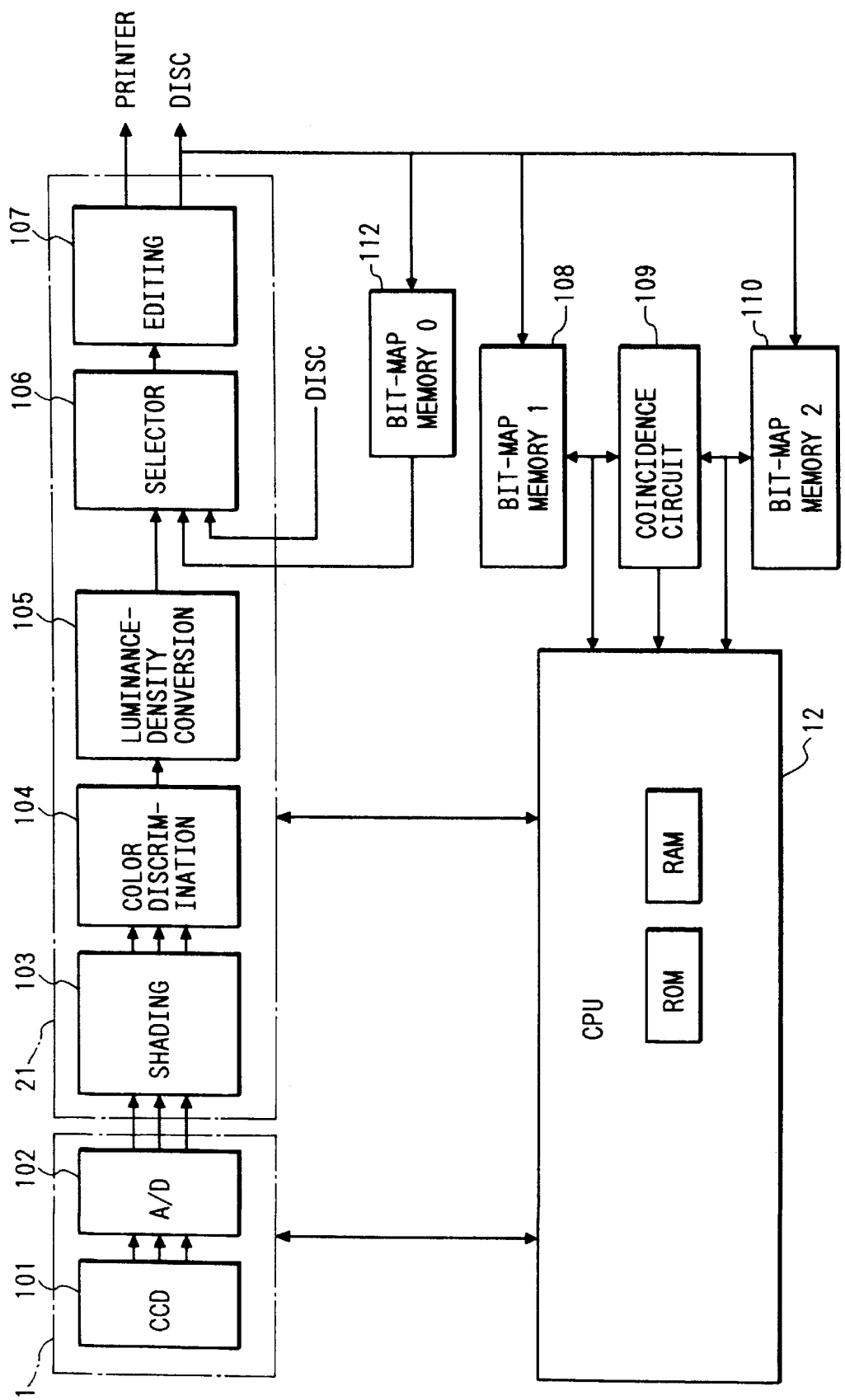
FIG. 30 is a block diagram showing the structure of a scanner, image processing unit and the like according to the seventh embodiment.

In the seventh embodiment, the larger size of either the image file or the retrieval image original is selectively reduced. Therefore, it become necessary to perform an equal magnification process or magnification changing process relative to the image data read from a retrieval image original. To this end, in the seventh embodiment, in addition to the two bit-map memories 108 and 110, the third bit-map memory 112 is provided as shown FIG. 30. The retrieval image data is temporarily stored in the bit-map memory 112, and thereafter the retrieval image data subject to a proper magnification process is stored in the bit-map memory 108.

Referring to FIG. 29, after the setting operation necessary for the file retrieval is performed in the similar manner described with the sixth embodiment (step S140), a retrieval image original is read (step S141). When reading the retrieval image original, the size of the original is detected and stored in RAM (step S142). The image data read from the retrieval image original is temporarily stored in the bit-map memory 112 (step S143).

In the retrieval operation by any one of the embodiment methods, image data are sequentially read from the photomagnetic disc. Prior to this read operation, the size of the file image data to be read is detected and compared with the size of the retrieval image original (step S144). If the size of the retrieval image original is larger, an equal magnification factor is set to the editing unit 107. The image data file is read from the photomagnetic disc (step S145) and the extracting operation and other operations are executed at the equal magnification factor, and the extracted image data file is stored in the bit-map memory 110 (step S146). A reduction factor is calculated and set to the editing unit 107. Then, the retrieval image original stored in the bit-map memory 112 is transferred to the editing unit 107. The retrieval image original is subject to the extracting and other operations and reduction operation (step S147), and stored in the bit-map memory 108 (step S148).

If it is judged at step S144 that the size of the retrieval image original is smaller, a reduction factor is calculated and set to the editing unit 107. The image data file is read from the photomagnetic disc (step S149). The extracting and other operations and reduction operation are executed by the editing unit 107, and the processed image data file is stored in the bit-map memory 110 (step S150). Next, an equal magnification factor is set to the editing unit 107. Then, the retrieval image original stored in the bit-map memory 112 is transferred to the editing unit 107. The retrieval image original is subject to the extracting and other operations at the equal magnification factor (step S151), and stored in the bit-map memory 108 (step S152).

After the sizes of both the retrieval image original and file image become coincident, the pattern matching and other operations like the sixth embodiment are performed (steps S153, S154).

The present invention is not limited only to the above-described embodiments, but various modifications are possible within the scope of the appended claims.

What is claimed is:

1. An image retrieving apparatus for retrieving a desired image from a storage medium upon which a plurality of images are stored, said apparatus comprising:

setting means for setting a retrieval mode in which the desired image is retrieved from said storage medium;

inputting means for inputting a comparison image as retrieval information for retrieving the desired image when the retrieval mode is set by said setting means;

a memory for storing the comparison image inputted by said inputting means;

comparing means for comparing the comparison image stored in said memory with a magnified image of each of the images stored in said storage medium; and retrieving means for retrieving the images corresponding to the magnified image coincident with or similar to the comparison image stored in said memory in accordance with a comparison result by said comparing means.

2. An apparatus according to claim 1, wherein said retrieving means outputs images corresponding to the magnified image coincident with or similar to the comparison image to be sensed visually.

3. An apparatus according to claim 1, wherein said retrieving means outputs an image number of images corresponding to the magnified image coincident with or similar to the comparison image as information.

4. An image retrieving apparatus for retrieving a desired image from a storage medium upon which a plurality of files and a plurality of retrieval images are stored, each of the retrieval images corresponding to a respective file, the apparatus comprising:

setting means for setting a retrieval mode in which a desired image is retrieved from said storage medium;

inputting means for inputting a comparison image as retrieval information for retrieving a desired file when the retrieval mode is set by said setting means;

a memory for storing the comparison image inputted by said inputting means;

comparing means for comparing the comparison image stored in said memory with the retrieval images stored in said storage medium; and retrieving means for retrieving the files corresponding to a retrieval image coincident with or similar to the comparison image stored in said memory in accordance with a comparison result by said comparing means.

5. An image retrieving apparatus according to claim 4, further comprising compressing means for compressing the comparison image, wherein said memory stores the data of the comparison image compressed by said compressing means, and wherein said comparing means compares the compressed data of the comparison image in said memory with the compressed data of the retrieval images stored in said storage medium.

6. An image retrieving apparatus according to claim 4, wherein the retrieval image is the image of a particular page of the file stored in said storage medium.

7. An image retrieving apparatus for retrieving a desired image from a storage medium upon which a plurality of images are stored, comprising:

setting means for setting a retrieval mode in which a desired image is retrieved from said storage medium;

inputting means for inputting a comparison image as retrieval information for retrieving the desired image when the retrieval mode is set by said setting means;

a memory for storing the comparison image inputted by said inputting means;

comparing means for comparing a pattern of an image in a designated area of the comparison image stored in said memory with the images stored in said storage medium; and retrieving means for retrieving the images from said storage medium that are coincident with or similar to the image in the designated area, in accordance with a comparison result by said comparing means.

8. An image retrieving apparatus according to claim 7, further comprising compressing means for compressing the comparison image, wherein said memory stores the data of the comparison image compressed by said compressing means, and wherein said comparing means compares the compressed data of the comparison image stored in said memory with the compressed data of the images stored in said storage medium.

9. An image retrieving method which is utilized in an image retrieving apparatus for retrieving a desired image from a storage medium upon which a plurality of images are stored, said method comprising the steps of:

a) setting a retrieval mode in which the desired image is retrieved from the storage medium;

b) inputting a comparison image as retrieval information for retrieving the desired image when the retrieval mode is set in said step a);

c) storing the comparison image inputted in said step b) in a memory;

d) comparing the comparison image stored in the memory with a magnified image of each of the images stored in the storage medium; and e) retrieving the images corresponding to the magnified image coincident with or similar to the comparison image stored in the memory in said step c) in accordance with a comparison result in said step d).

10. An image retrieving apparatus according to claim 7, further comprising color designating means for designating said particular color.

11. An image retrieving apparatus for retrieving a desired image from a storage medium upon which a plurality of images are stored, comprising:

designating means for manually designating a desired area of an image of a document;

outputting means for outputting the image of the area designated by said designating means as a comparison image for retrieving the desired image;

a memory for storing the comparison image output from said outputting means;

comparing means for comparing the comparison image stored in said memory with the images stored in said storage medium; and retrieving means for retrieving the images from said storage medium coincident with or similar to the comparison image stored in said memory, in accordance with a comparison result by said comparing means.

12. An image retrieving apparatus according to claim 11, wherein said designating means designates said desired area of said original by surrounding by a line drawn with a marker pen of a particular color.

13. An image retrieving apparatus according to claim 11, wherein said outputting means includes reading means for reading the image of the document.

14. An image retrieving apparatus according to claim 11, further comprising compressing means for compressing the comparison image, wherein said memory stores the data of the comparison image, and wherein said comparing means compares the compressed data of the comparison image stored in said memory with the compressed data of the images stored in said storage medium.

15. An image retrieving apparatus for retrieving a desired image from a storage medium upon which a plurality of images are stored, said apparatus comprising:

setting means for setting a retrieval mode in which the desired image is retrieved from said storage medium;

inputting means for inputting a comparison image as retrieval information for retrieving the desired image when the retrieval mode is set by said setting means;

a memory for storing the comparison image inputted by said inputting means;

size converting means for zooming the comparison image or the image stored in said storage medium to make the comparison image and the image stored in said storage medium almost coincide with each other;

comparing means for comparing these images of which sizes are almost coincided with each other by said size converting means; and retrieving means for retrieving the images in said storage medium coincident with or similar to the comparison image stored in said memory in accordance with a comparison result by said comparing means.

16. An image retrieving method which is utilized in an image retrieving apparatus for retrieving a desired image from a storage medium upon which a plurality of images are stored, said method comprising the steps of:

a) setting a retrieval mode in which the desired image is retrieved from the storage medium;

b) inputting a comparison image as retrieval information for retrieving the desired image when the retrieval mode is set in said step a);

c) storing the comparison image inputted in said step b) in a memory;

d) zooming the comparison image or the image stored in the storage medium to make the comparison image and the image stored in the storage medium almost coincide with each other;

e) comparing these images of which sizes were almost coincided with each other in said step d); and f) retrieving the images in the storage medium coincident with or similar to the comparison image stored in the memory in said step c) in accordance with a comparison result in said step e).

17. An image retrieving apparatus according to claim 4, wherein said retrieving means outputs images of files corresponding to the retrieval image coincident with or similar to the comparison image to be sensed visually.

18. An image retrieving apparatus according to claim 4, wherein said retrieving means outputs a file number of files corresponding to the retrieval image coincident with or similar to the comparison image as information.

19. An image retrieving apparatus according to claim 7, wherein said retrieving means outputs an image coincident with or similar to the comparison image to be sensed visually.

20. An image retrieving apparatus according to claim 7, wherein said retrieving means outputs an image number corresponding to the image coincident with or similar to the comparison image, as information.

21. An image retrieving apparatus according to claim 11, wherein said retrieving means outputs the image coincident with or similar to the comparison image, to be sensed visibly.

22. An image retrieving apparatus according to claim 11, wherein said retrieving means outputs an image number corresponding to the image coincident with or similar to the comparison image, as information.

23. An image retrieving method which is utilized in an image retrieving apparatus for retrieving a desired image from a storage medium upon which a plurality of files and a plurality of retrieval images are stored, each of the retrieval images corresponding to a respective file, said method comprising the steps of:

a) setting a retrieval mode in which a desired image is retrieved from said storage medium;

b) inputting a comparison image as retrieval information for retrieving the desired image when the retrieval mode is set by said setting means;

c) storing the comparison image inputted in said step b in a memory;

d) comparing the comparison image stored in the memory with the retrieval images stored in said storage medium; and e) retrieving the files corresponding to a retrieval image coincident with or similar to the comparison image stored in said memory in said step c in accordance with a comparison result in said step d.

24. A computer readable recording medium in which a program is stored to cause an image retrieving apparatus for retrieving a desired image, from a storage medium upon which a plurality of images are stored, to execute program steps comprising:

a) setting a retrieval mode in which the desired image is retrieved from the storage medium;

b) inputting a comparison image as retrieval information for retrieving the desired image when the retrieval mode is set in said step a);

c) storing the comparison image inputted in said step b) in a memory;

d) comparing the comparison image stored in the memory with the retrieved images stored in the storage medium; and e) retrieving files corresponding to a retrieval image coincident with or similar to the comparison image stored in the memory in said step c) in accordance with a comparison result in said step d).

25. A computer readable recording medium in which a program is stored to cause an image retrieving apparatus for retrieving a desired image, from a storage medium upon which a plurality of images are stored, to execute program steps comprising:

a) setting a retrieval mode in which the desired image is retrieved from the storage medium;

b) inputting a comparison image as retrieval information for retrieving the desired image when the retrieval mode is set in said step a);

c) storing the comparison image inputted in said step b) in a memory;

d) comparing an image in a designated area of the comparison image stored in the memory with the images stored in the storage medium; and e) retrieving images from the storage medium corresponding to the retrieval image coincident with or similar to the comparison image stored in the memory in said step c), in accordance with a comparison result in said step d).

26. A computer readable recording medium in which a program is stored to cause an image retrieving apparatus for retrieving a desired image, from a storage medium upon which a plurality of images are stored, to execute program steps comprising:

a) manually designating a desired area of an image of a document;

b) outputting the image of the area designated in said step a) as a comparison image for retrieving the desired image;

c) storing the comparison image outputted in said step b) in a memory;

d) comparing the comparison image stored in the memory with the images stored in the storage medium; and e) retrieving images from the storage medium that are coincident with or similar to the comparison image stored in the memory in said step c), in accordance with a comparison result in said step d).

27. A computer readable recording medium in which a program is stored to cause an image retrieving apparatus for retrieving a desired image, from a storage medium upon which a plurality of images are stored, to execute program steps comprising:

a) setting a retrieval mode in which the desired image is retrieved from the storage medium;

b) inputting a comparison image as retrieval information for retrieving the desired image when the retrieval mode is set in said step a);

c) storing the comparison image inputted in said step b) in a memory;

d) comparing the comparison image stored in the memory with a magnified image of each of the images stored in the storage medium; and e) retrieving the images corresponding to the magnified image coincident with or similar to the comparison image stored in the memory in said step c) in accordance with a comparison result in said step d).

28. A computer readable recording medium in which a program is stored to cause an image retrieving apparatus for retrieving a desired image, from a storage medium upon which a plurality of images are stored, to execute program steps comprising:

a) setting a retrieval mode in which the desired image is retrieved from the storage medium;

b) inputting a comparison image as retrieval information for retrieving the desired image when the retrieval mode is set in said step a);

c) storing the comparison image inputted in said step b) in a memory;

d) zooming the comparison image or the image stored in the storage medium to make the comparison image and the image stored in the storage medium almost coincide with each other;

e) comparing these images of which sizes were almost coincided with each other in said step d); and f) retrieving the images in the storage medium coincident with or similar to the comparison image stored in the memory in said step c) in accordance with a comparison result in said step e).

29. An image retrieving method which is utilized in an image retrieving apparatus for retrieving a desired image from a storage medium upon which a plurality of images are stored, said method comprising the steps of:

a) manually designating a desired area of an image of a document;

b) outputting the image of the area designated in said step a as a comparison image for retrieving the desired image;

c) storing the comparison image outputted in said step b in a memory;

d) comparing the comparison image stored in the memory with the images stored in said storage medium; and e) retrieving images from said storage medium that are coincident with or similar to the comparison image stored in said memory in said step c, in accordance with a comparison result in said step d.

30. An image retrieving method which is utilized in an image retrieving apparatus for retrieving a desired image from a storage medium upon which a plurality of images are stored, said method comprising the steps of:

a) setting a retrieval mode in which a desired image is retrieved from said storage medium;

b) inputting a comparison image as retrieval information for retrieving the desired image when the retrieval mode is set by said setting means;

c) storing the comparison image inputted in said step b in a memory;

d) comparing an image in a designated area of the comparison image stored in the memory with the images stored in said storage medium; and e) retrieving images from said storage medium corresponding to the retrieval image coincident with or similar to the comparison image stored in said memory in said step c, in accordance with a comparison result in said step d.

\* \* \* \* \*

UNITED STATES PATENT AND TRADEMARK OFFICE
CERTIFICATE OF CORRECTION

PATENT NO. : 5,991,466

DATED : November 23, 1999

INVENTOR(S): TAKAHIRO USHIRO, ET AL.

It is certified that error appears in the above-identified patent and that said Letters Patent is hereby corrected as shown below:

COLUMN 8,
Line 56, "displays" should read --display--;
Line 60, "43" should read --43 is--; and
Line 65, "basing" should read --based--..

COLUMN 11,
Line 62, "become" should read --becomes.

Signed and Sealed this

Seventh Day of November, 2000

Attest:

Q. TODD DICKINSON

*Attesting Officer*     *Director of Patents and Trademarks*